(12) United States Patent
Reitzloff et al.

(10) Patent No.: US 7,399,030 B2
(45) Date of Patent: Jul. 15, 2008

(54) AUTOMOTIVE VEHICLE OPEN AIR SYSTEM

(75) Inventors: Cliff R. Reitzloff, Northville, MI (US); Michael J. Urban, Windsor (CA)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 0 days.

(21) Appl. No.: 11/637,578

(22) Filed: Dec. 12, 2006

(65) Prior Publication Data

US 2007/0114818 A1 May 24, 2007

Related U.S. Application Data

(62) Division of application No. 11/154,456, filed on Jun. 16, 2005, now Pat. No. 7,163,260.

(60) Provisional application No. 60/580,584, filed on Jun. 17, 2004, provisional application No. 60/642,378, filed on Jan. 7, 2005, provisional application No. 60/676,605, filed on Apr. 29, 2005.

(51) Int. Cl.
*B60J 7/06* (2006.01)
(52) U.S. Cl. .................................................. 296/219
(58) Field of Classification Search .................. 296/219
See application file for complete search history.

(56) References Cited

U.S. PATENT DOCUMENTS

| | | | |
|---|---|---|---|
| 1,910,075 A | 5/1933 | Westad | |
| 2,042,431 A | 6/1936 | Hooper | |
| 2,103,372 A | 12/1937 | Lange | |
| 2,580,337 A | 12/1951 | Votypka | |
| 2,985,483 A | 5/1961 | Bishop et al. | |
| 3,298,731 A | 1/1967 | Sangimino | |
| 3,702,430 A | 11/1972 | Knetsch et al. | |
| 3,953,067 A | 4/1976 | Isola | |
| 3,960,404 A | 6/1976 | Bienert et al. | |
| 4,063,774 A | 12/1977 | Hanks | |

(Continued)

FOREIGN PATENT DOCUMENTS

DE 1288929 2/1969

(Continued)

OTHER PUBLICATIONS 1 copy of a blueprint of the roof assembly for the Studebaker Wagonaire, published, offered for sale and/or publicly used about 1963.

(Continued)

*Primary Examiner*—Dennis H Pedder
(74) *Attorney, Agent, or Firm*—Harness, Dickey & Pierce, P.L.C.

(57) ABSTRACT

In accordance with the present teachings, an automotive vehicle open air system includes a pair of tracks connected to the vehicle, a flexible roof that is coupled to the tracks, one or more movement mechanisms that are integrated in the tracks and connected to the roof, an automatic actuator and a rear header that is connected to the roof and is movable with the roof. Other aspects of the teachings, the rear header may include a stop light that is mounted in the header or it may include a rear windshield wiper system.

25 Claims, 33 Drawing Sheets

U.S. PATENT DOCUMENTS

| | | | |
|---|---|---|---|
| 4,085,965 A | 4/1978 | Schlapp et al. | |
| 4,143,907 A | 3/1979 | Ireland et al. | |
| 4,227,739 A | 10/1980 | Sorensen | |
| 4,272,121 A | 6/1981 | Kim | |
| 4,329,594 A | 5/1982 | Bohm et al. | |
| 4,371,204 A | 2/1983 | George et al. | |
| 4,502,726 A | 3/1985 | Adams | |
| 4,556,835 A | 12/1985 | Vogel et al. | |
| 4,561,691 A | 12/1985 | Kawai et al. | |
| 4,629,953 A | 12/1986 | Inoue et al. | |
| 4,630,858 A | 12/1986 | Bez et al. | |
| 4,644,699 A | 2/1987 | Chandler et al. | |
| 4,733,145 A | 3/1988 | Ohashi et al. | |
| 4,811,985 A | 3/1989 | Kruger et al. | |
| 4,835,449 A | 5/1989 | Huehn | |
| 4,910,445 A | 3/1990 | Borrmann et al. | |
| 4,968,090 A | 11/1990 | Schleicher et al. | |
| 4,991,902 A | 2/1991 | Schrader et al. | |
| 5,018,783 A | 5/1991 | Chamings et al. | |
| 5,106,151 A * | 4/1992 | Nishikawa et al. | 296/219 |
| 5,121,958 A | 6/1992 | Goeden et al. | |
| 5,141,283 A | 8/1992 | Omoto et al. | |
| 5,152,577 A | 10/1992 | Omoto et al. | |
| 5,169,206 A | 12/1992 | Omoto et al. | |
| 5,185,562 A | 2/1993 | Huyer | |
| 5,203,605 A | 4/1993 | Grimm et al. | |
| 5,225,747 A | 7/1993 | Helms et al. | |
| 5,242,210 A * | 9/1993 | Fujisawa et al. | 296/219 |
| 5,250,882 A | 10/1993 | Odoi et al. | |
| 5,310,241 A | 5/1994 | Omoto et al. | |
| 5,451,849 A | 9/1995 | Porter et al. | |
| 5,540,478 A | 7/1996 | Schuch et al. | |
| 5,551,197 A | 9/1996 | Repp et al. | |
| 5,704,173 A | 1/1998 | Repp et al. | |
| 5,734,727 A | 3/1998 | Flaherty et al. | |
| 5,746,475 A | 5/1998 | Caye et al. | |
| 5,825,147 A | 10/1998 | Porter et al. | |
| 5,898,392 A | 4/1999 | Bambini et al. | |
| 5,934,727 A | 8/1999 | Storc et al. | |
| 5,944,378 A | 8/1999 | Mather et al. | |
| 5,951,100 A | 9/1999 | Ewing et al. | |
| 5,961,177 A | 10/1999 | Caye et al. | |
| 6,010,180 A | 1/2000 | Bureau et al. | |
| 6,030,022 A | 2/2000 | Bormann et al. | |
| 6,074,078 A | 6/2000 | Georgeff et al. | |
| 6,114,819 A | 9/2000 | Porter et al. | |
| 6,119,760 A | 9/2000 | Poole | |
| 6,217,096 B1 | 4/2001 | Koiwa et al. | |
| 6,246,199 B1 | 6/2001 | Porter et al. | |
| 6,288,511 B2 | 9/2001 | Porter et al. | |
| 6,305,740 B1 | 10/2001 | Staser et al. | |
| 6,322,137 B1 | 11/2001 | Munsters et al. | |
| 6,325,436 B1 | 12/2001 | Ehrenberger et al. | |
| 6,325,452 B1 | 12/2001 | Johannes Sanders et al. | |
| 6,340,204 B1 | 1/2002 | Seifert et al. | |
| 6,345,859 B1 | 2/2002 | Thomas et al. | |
| 6,398,296 B1 | 6/2002 | Mayer et al. | |
| 6,412,859 B1 | 7/2002 | Wilhelmus Thijssen et al. | |
| 6,416,104 B1 | 7/2002 | Fisher et al. | |
| 6,428,090 B1 | 8/2002 | Reinsch et al. | |
| 6,431,644 B1 | 8/2002 | Nagashima et al. | |
| 6,454,346 B1 | 9/2002 | Nabuurs et al. | |
| 6,478,355 B1 | 11/2002 | Van Eden et al. | |
| 6,478,368 B1 | 11/2002 | de Gaillard et al. | |
| 6,485,094 B2 | 11/2002 | Corder et al. | |
| 6,494,528 B2 | 12/2002 | Tolinski et al. | |
| 6,497,448 B1 | 12/2002 | Curtis et al. | |
| 6,517,135 B2 | 2/2003 | de Gaillard et al. | |
| 6,520,570 B2 | 2/2003 | Schatzler | |
| 6,568,732 B2 | 5/2003 | De Gaillard et al. | |
| 6,604,782 B2 | 8/2003 | De Gaillard et al. | |
| 6,634,699 B2 | 10/2003 | Collins et al. | |
| 6,672,638 B2 | 1/2004 | Corder et al. | |
| 6,676,189 B2 | 1/2004 | Schall et al. | |
| 6,676,192 B2 | 1/2004 | Marold et al. | |
| 6,783,172 B2 | 8/2004 | De Gaillard et al. | |
| 6,860,549 B2 | 3/2005 | Engelgau | |
| 6,866,335 B2 | 3/2005 | Tolinski et al. | |
| 6,899,382 B2 | 5/2005 | Engelgau | |
| 6,926,354 B2 | 8/2005 | Munsters et al. | |
| 7,051,781 B2 | 5/2006 | Grimm et al. | |
| 2002/0089204 A1 | 7/2002 | Fisher et al. | |
| 2003/0085594 A1 | 5/2003 | Engelgau | |
| 2004/0017097 A1 | 1/2004 | Albert et al. | |
| 2004/0051347 A1 | 3/2004 | Manders et al. | |
| 2005/0110304 A1 | 5/2005 | Engelgau | |
| 2005/0134096 A1 | 6/2005 | Fallis et al. | |
| 2005/0280293 A1 | 12/2005 | MacNee et al. | |

FOREIGN PATENT DOCUMENTS

| | | | | |
|---|---|---|---|---|
| EP | 0376203 | * | 7/1990 | 296/219 |
| EP | 0466529 | | 1/1992 | |
| EP | 0774371 | | 5/1997 | |
| GB | 2077461 | | 12/1981 | |
| GB | 2184404 | | 6/1987 | |
| JP | 63-40228 | * | 3/1988 | |
| JP | 0103733 | * | 5/1988 | 296/219 |
| JP | 3-159818 | | 7/1991 | |
| JP | 3-197232 | | 8/1991 | |

OTHER PUBLICATIONS 16 color photographs of the rear roof movement of a 1965 Studebaker Wagonaire, offered for sale and publicly used in 1965.
2 factory photographs of a 1963 Studebaker Wagonaire, published 1963.
2 web pages illustrating a 2004 GMC Envoy XUV with an opened roof, offered for sale in 2004.
Advertisement—InfiniVu™ Roof Systems, ASC®, Automotive News, pp. 16B-16C, Dec. 18, 2006 (2 pages).
Advertisement—View to the Cosmos, ASC Inc., Automotive News, p. 3, Jan. 9, 2006 (1 page).
Webasto Hollandia 400 brochure, 2 pages, published 2003.
Webasto sliding sunroof and headliner restoration on a 1959 Mercedes-Benz Type 220S Ponton sedan, 16 pages, published Aug. 7, 2002.

* cited by examiner

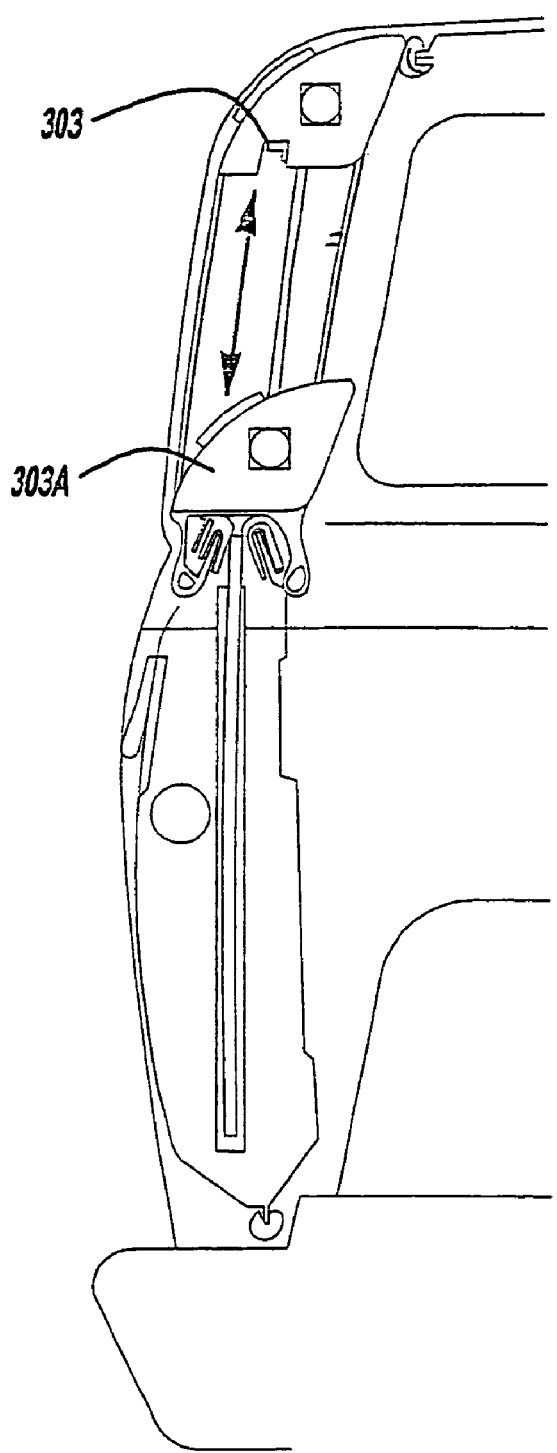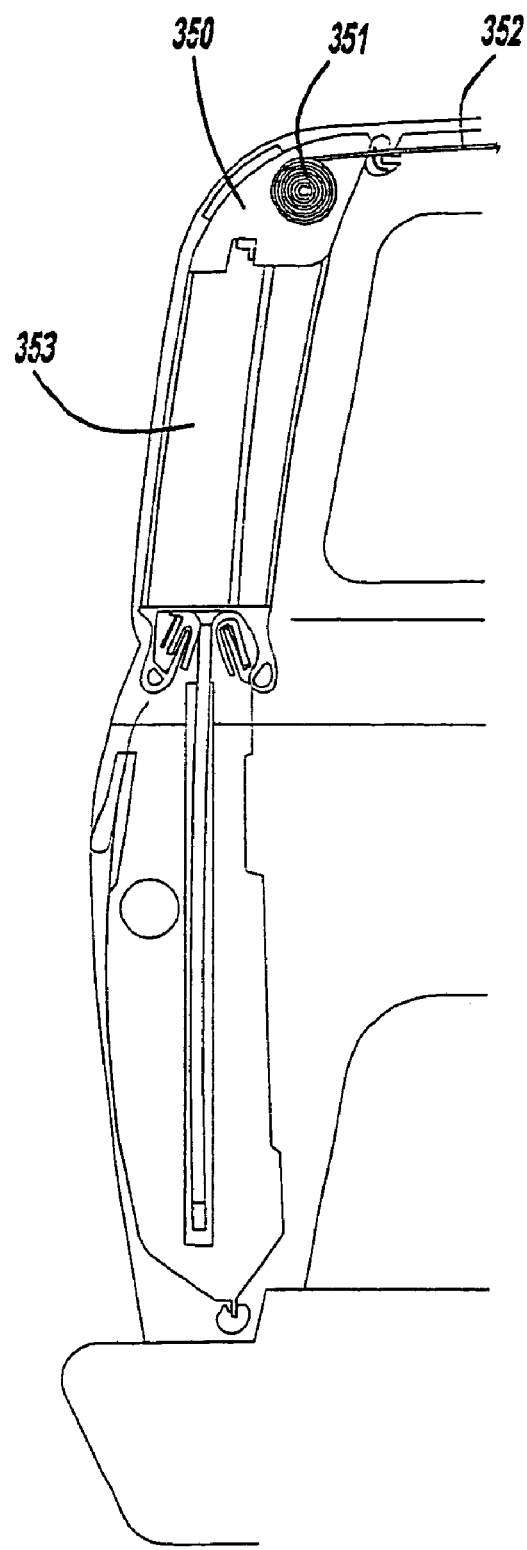

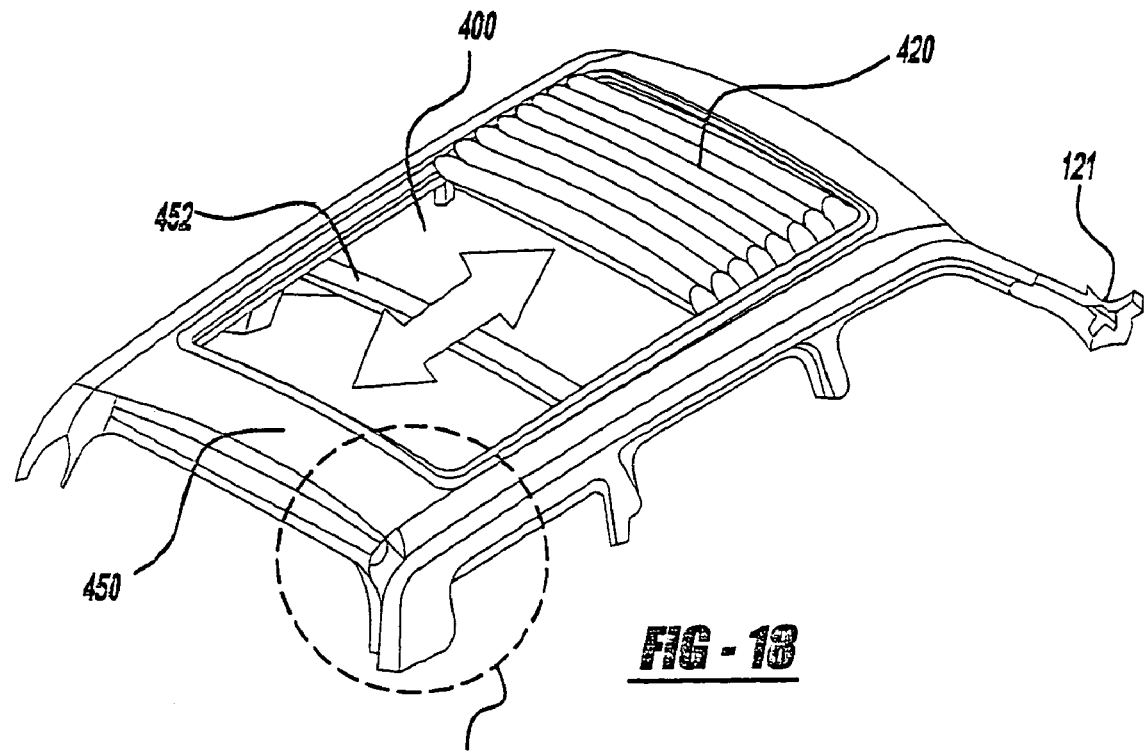
FIG-18
Fig 25
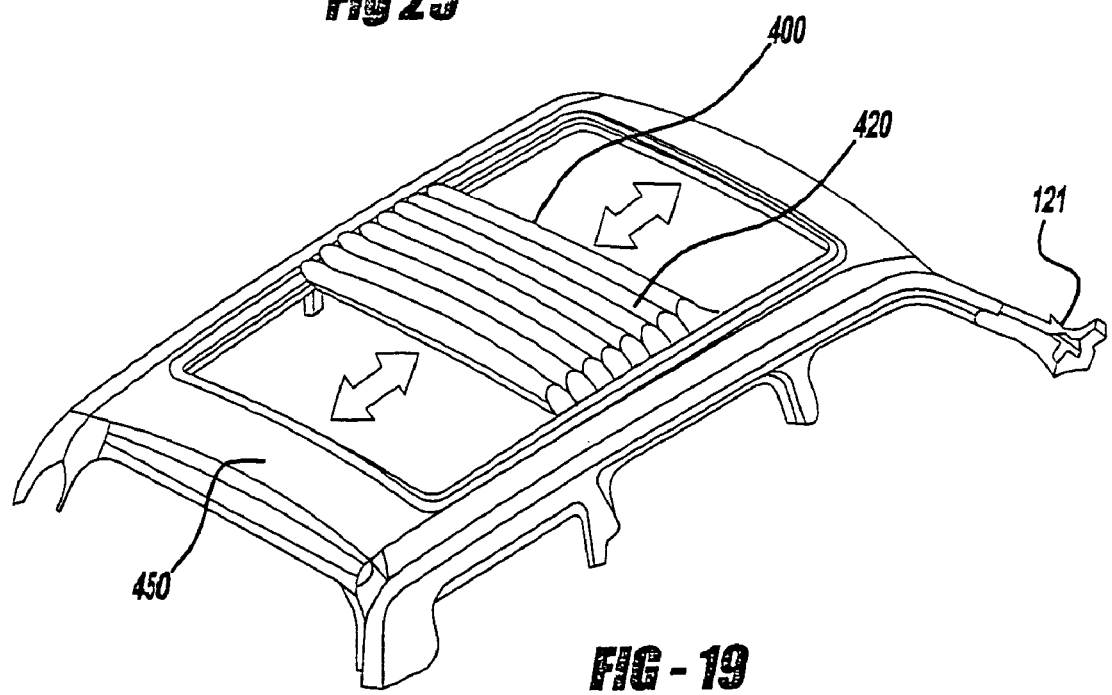
FIG-19

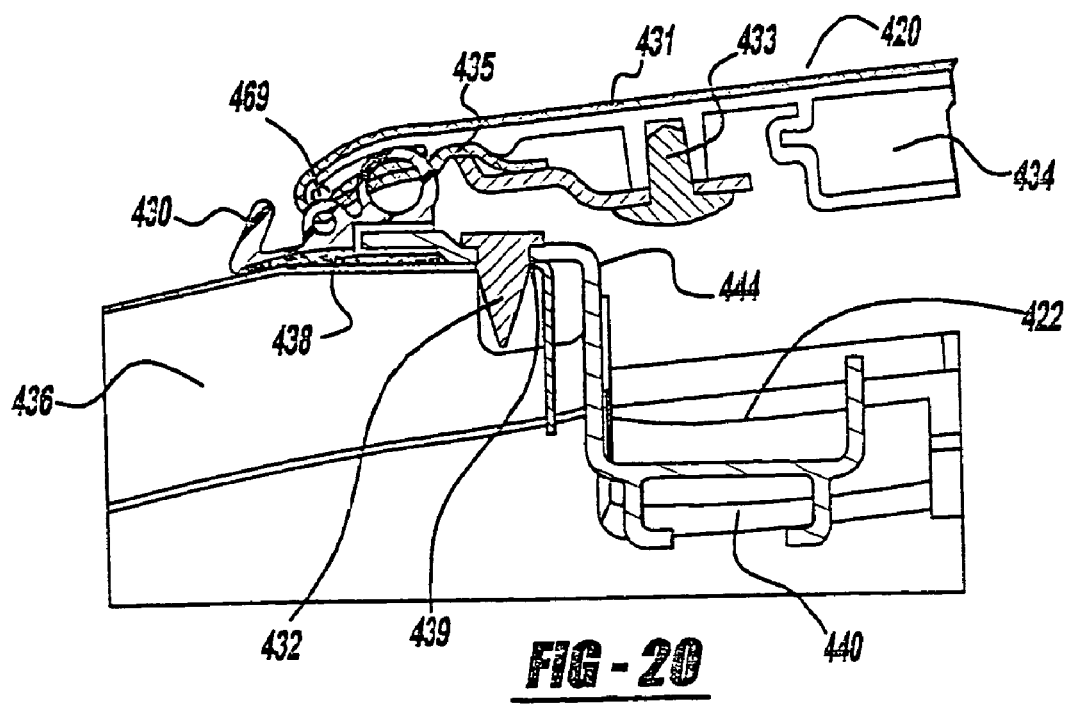
FIG-20
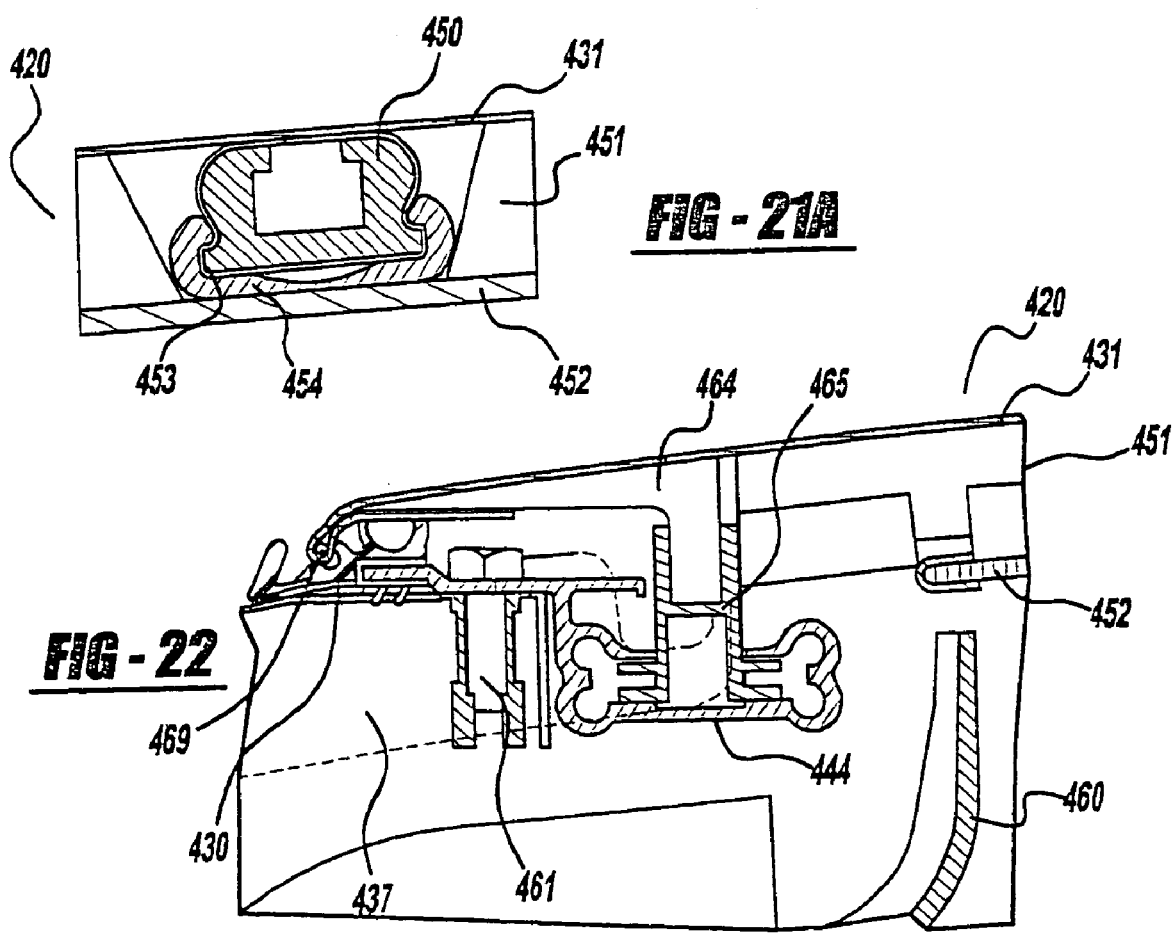
FIG-21A
FIG-22

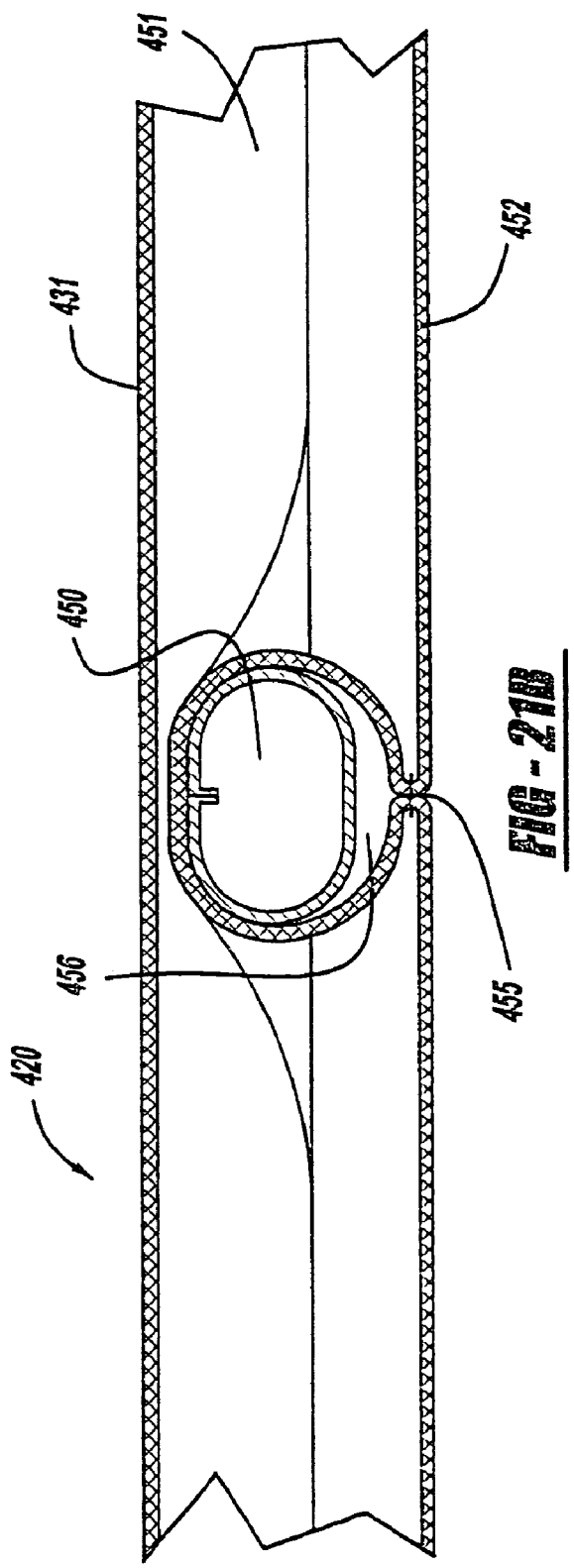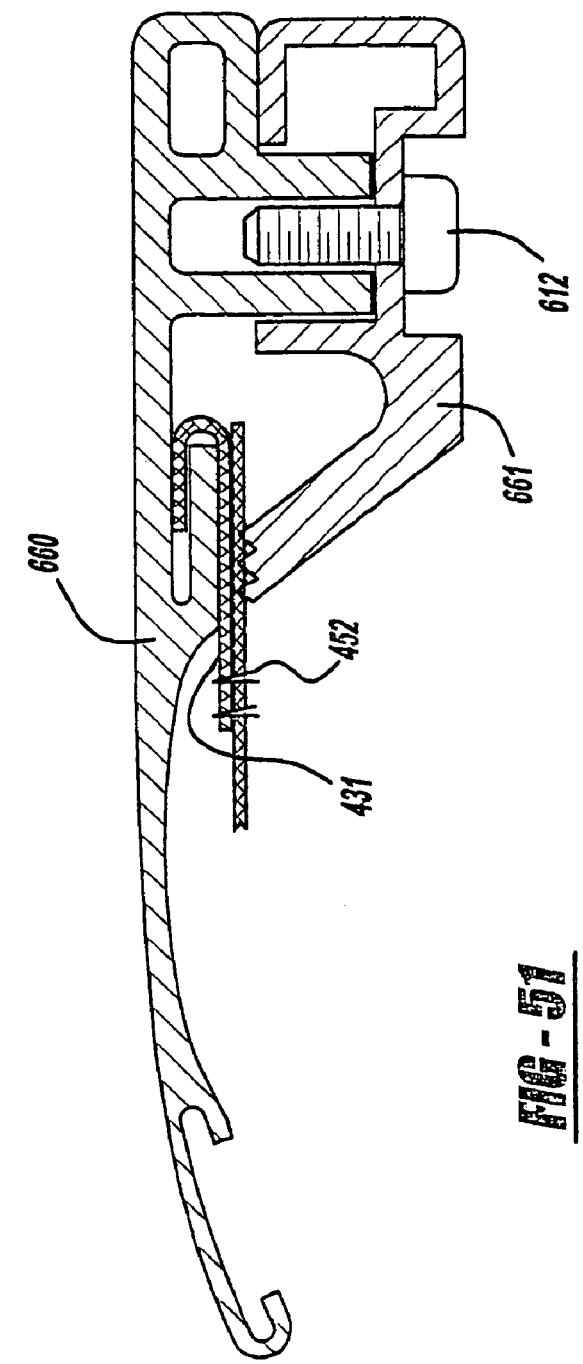

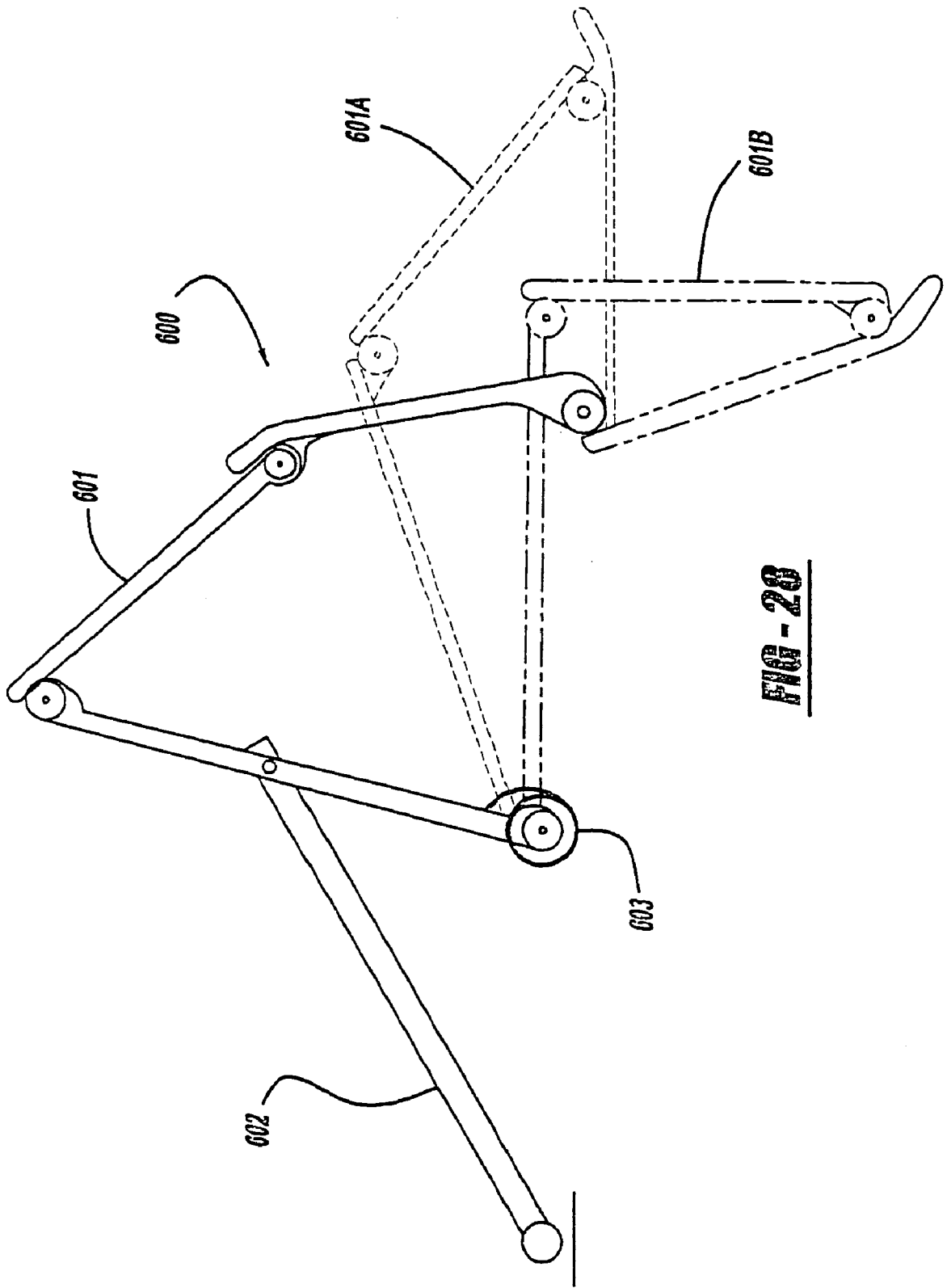

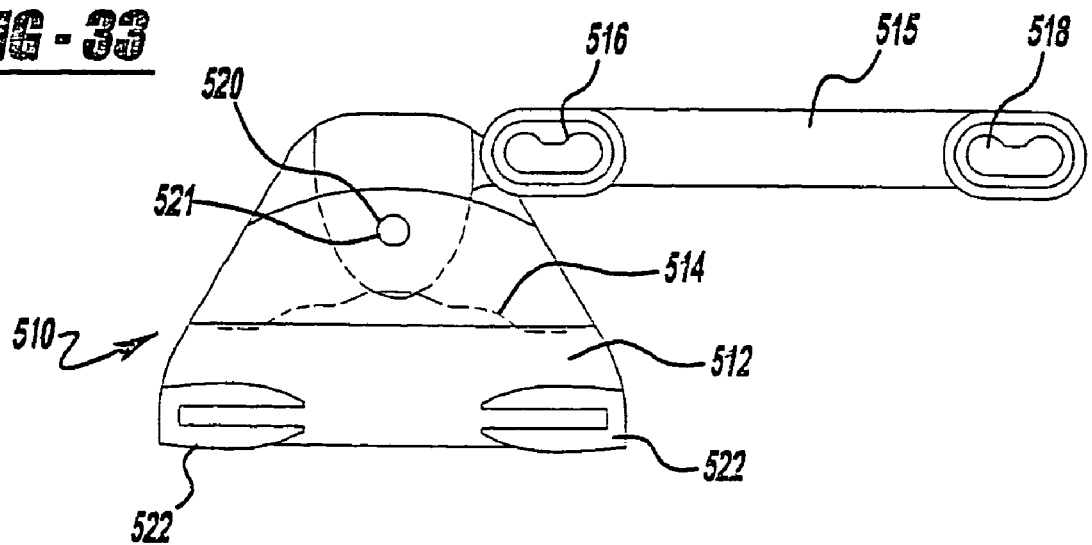
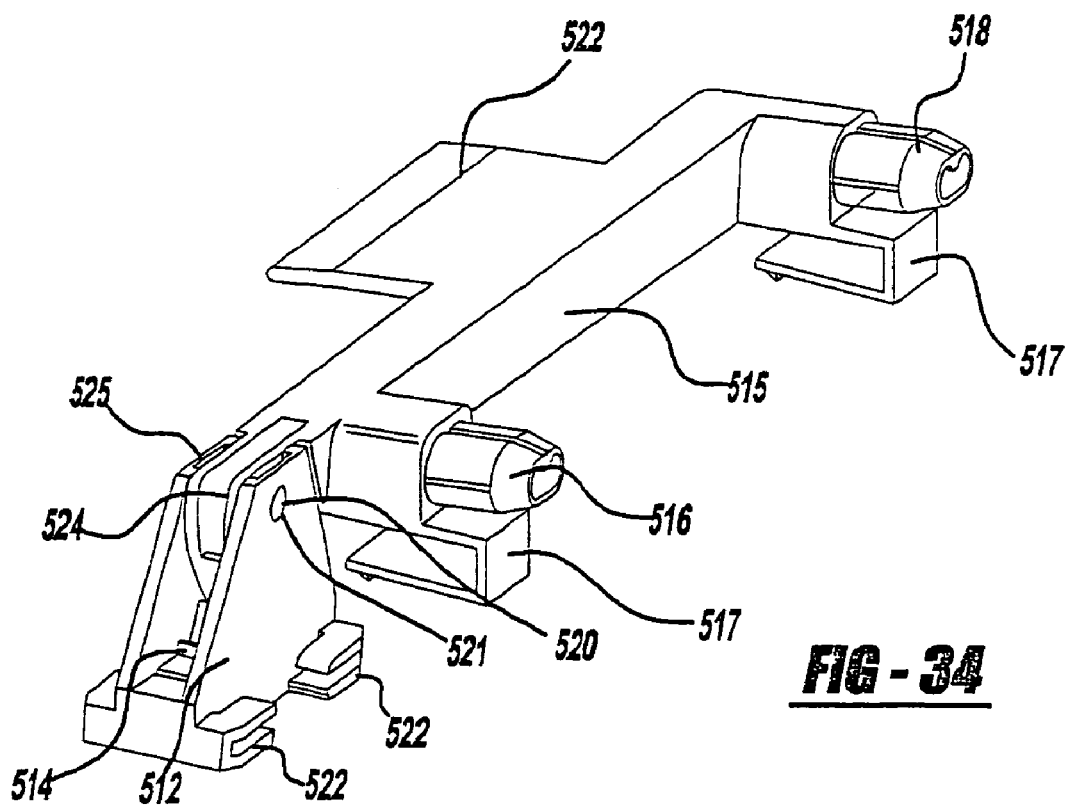

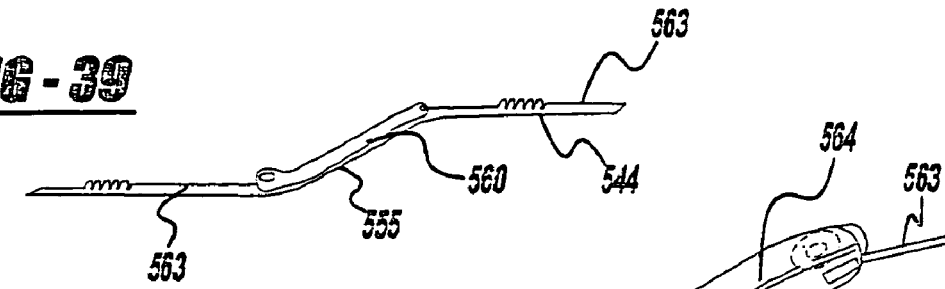
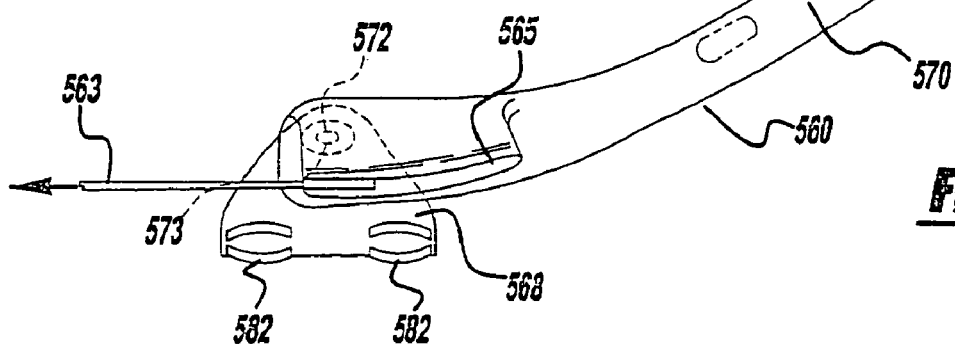
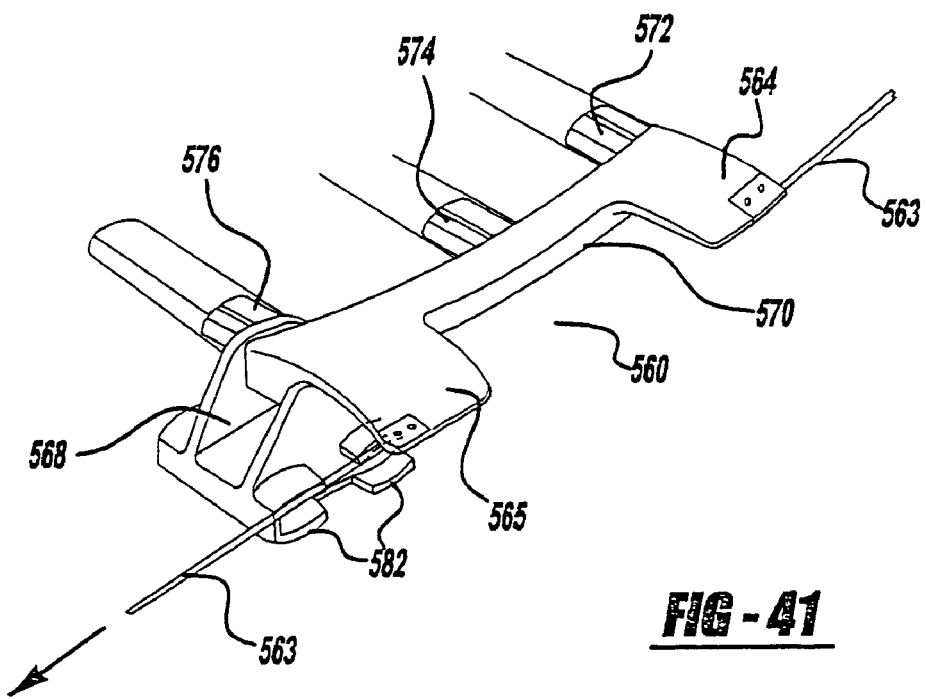

AUTOMOTIVE VEHICLE OPEN AIR SYSTEM

CROSS-REFERENCE TO RELATED APPLICATIONS

This application is a divisional application of U.S. application Ser. No. 11/154,456, filed on Jun. 16, 2005 now U.S. Pat. No. 7,163,260 which claims priority to U.S. Provisional Application Ser. No. 60/580,584, filed on Jun. 17, 2004; U.S. Provisional Application Ser. No. 60/642,378, filed on Jan. 7, 2005; and U.S. Provisional Application Ser. No. 60/676,605, filed on Apr. 29, 2005; all of the above applications are incorporated herein by reference.

FIELD OF THE INVENTION

The present invention generally relates to automotive vehicles and, more particularly, to a moveable flexible roof for use in an automotive vehicle.

BACKGROUND AND SUMMARY

It is known to employ flexible roof covers for automotive vehicles. For example, a flexible roof cover can be retracted by winding it around a spring loaded roller. Such designs are disclosed in U.S. Pat. No. 1,245,278 to Sherman issued Nov. 6, 1917; U.S. Pat. No. 1,738,060 to Barnes issued Dec. 3, 1929; U.S. Pat. No. 1, 910,075 to Westad issued May 23, 1933; U.S. Pat. No. 3,298,731 to Sangimino issued Jan. 17, 1967; and U.S. Pat. No. 3,658,378 to Sutren issued Apr. 25, 1972. More recent variations of single and flexible sunroof covers are disclosed in U.S. Pat. No. 4,893,868 to Miller et al. issued Jan. 16, 1990; U.S. Pat. No. 5,018,783 to Chaming et al. issued May 28, 1991; U.S. Pat. No. 5,152,577 to Omoto et al. issued Oct. 6, 1992; U.S. Pat. No. 5,944,378 to Mather et al. issued Aug. 31, 1999; U.S. Pat. No. 6,322,137 to Munsters issued Nov. 27, 2001; U.S. Patent Application Publication No. 2004/0017097 to Albert et al. published Jan. 29, 2004; and U.S. Patent Application Publication No. 2004/0135404 to Nellen et al. published Jul. 15, 2004.

Various attempts have also been made to allow vertical and rear accessibility to a storage compartment in an otherwise enclosed vehicle. Such designs are disclosed in U.S. Pat. No. 6,478,368 to de Gaillard issued Nov. 12, 2002; U.S. Pat. No. 6,485,094 to Corder et al. issued Nov. 26, 2002; and U.S. Pat. No. 6,860,549 to Engelgau issued Mar. 1, 2005. Although the above patents solve some of the problems in the art, they are limited in the application for the class of automotive vehicle known as sport utility vehicles (SUV).

In accordance with the present invention, various embodiments include an automotive vehicle open air system including at least one track connected to a vehicle, a flexible roof that is coupled to the track, and one or more movement mechanisms coupling the roof to the track. In another aspect of the present invention, an automatic actuator and a rear header that is connected to and is movable with the roof are provided. Another aspect of the present invention employs a rear header that includes a stop light and/or a rear window wiper system. In some embodiments of the present invention, a track may include a power strip and a header may include an electrical connection to the power strip so that electric features such as a stop lamp or interior reading lamp may be powered in any position of the roof. In certain embodiments of the invention, a moveable roof covers an opening that encompasses essentially the entire passenger and cargo compartments of an automotive vehicle. In a further embodiment of the present invention, an open air system for an automotive vehicle includes a flexible roof member, a plurality of cross bows supporting the roof, a pair of channels which are substantially parallel and located on each side of the vehicle, at least one movement mechanism, an actuator, electronic control unit which controls the actuator and the movement mechanism, and a rear header that is attached to and moveable with the roof.

In various embodiments, an automotive vehicle roof employs two end bows, each having two molded corners connected to a first extruded piece and a second extruded piece which is connected below the first extruded piece, cross bows, fabric fastened between the first and second pieces of the two end bows, and/or seams in the fabric which provide pockets in the fabric that connect the cross bows to the fabric. An additional embodiment of the present invention includes a lifting mechanism for a soft top roof. A further aspect of the present invention uses a slider element that is moveable on a guide track attached to a vehicle, an arm connected to the slider at a pivot point and is moveable from a neutral to a lift position, a biasing member that can hold the arm in a neutral position and/or at least two cross bow connectors located on the arm above the pivot point. In still other embodiments, the present invention includes an open air system for an automotive vehicle including a vehicle roof with an aperture and a step, fore and aft extending side rails, tracks connected to a vehicle frame, a flexible roof coupled to the tracks, a movement mechanism coupling the tracks to the roof, a drive mechanism to move the roof between a closed position and a plurality of open positions, and a lift mechanism that is shaped to fit in the step when the roof is in a closed position operably holding the roof taut over the entirety of the aperture.

The automotive vehicle open air system of the present invention is advantageous over conventional devices in that it is aesthetically pleasing, refined, quick to operate and allows the conversion of a vehicle into an open air off-road type vehicle. Other advantageous of the present invention include the ease of use when opening the roof, especially when hauling cargo that may be taller than the interior of the vehicle. Additional advantages and features of the present invention will become apparent from the following description and appended claims taken in conjunction with the accompanying drawings.

BRIEF DESCRIPTION OF THE DRAWINGS

The present invention will become more fully understood from the detailed description and the accompanying drawings, wherein:

FIGS. 11A-11D are diagrammatic views of a first and a second alternate embodiment of the present invention showing a rear tailgate and a retractable rear header.

FIG. 18 is a rear perspective view of the second preferred embodiment showing the open air system opening from the rear.

FIG. 19 is a rear perspective view of the second preferred embodiment showing the open air system opening from the front and the rear.

FIG. 20 is a cross sectional view taken along line 20-20 of FIG. 16 showing the third preferred embodiment of an open air system.

FIGS. 21A-21B are cross sectional views taken along line 21-21 of FIG. 16 at a roof bow area.

FIG. 22 is a cross sectional view taken along line 22-22 of FIG. 16 showing the second preferred embodiment of the open air system.

FIG. 28 is a side view of a first alternative embodiment of a wind deflector.

FIG. 33 is a side view of a preferred embodiment of a lift mechanism.

FIG. 34 is a perspective view of a preferred embodiment of a lift mechanism.

FIG. 39 is a side view of a third preferred embodiment of a lift arm mechanism.

FIG. 40 is another side view of a third preferred embodiment of a lift arm mechanism.

FIG. 41 is a perspective view of a third preferred embodiment of a lift arm mechanism.

FIG. 42 is a cross sectional view of FIG. 37 along line 42-42 showing preferred embodiment on end bow.

FIG. 51 is a cross sectional view of FIG. 50 along line 51-51 of subassembly showing end bow area.

DETAILED DESCRIPTION OF THE PREFERRED EMBODIMENTS

The following description of the preferred embodiments is merely exemplary in nature and is in no way intended to limit the invention, its application, or uses. The present invention provides devices and methods related to open air roof systems for automotive vehicles. The following definitions and non-limiting guidelines must be considered in reviewing the description of this invention set forth herein.

Figure 1:
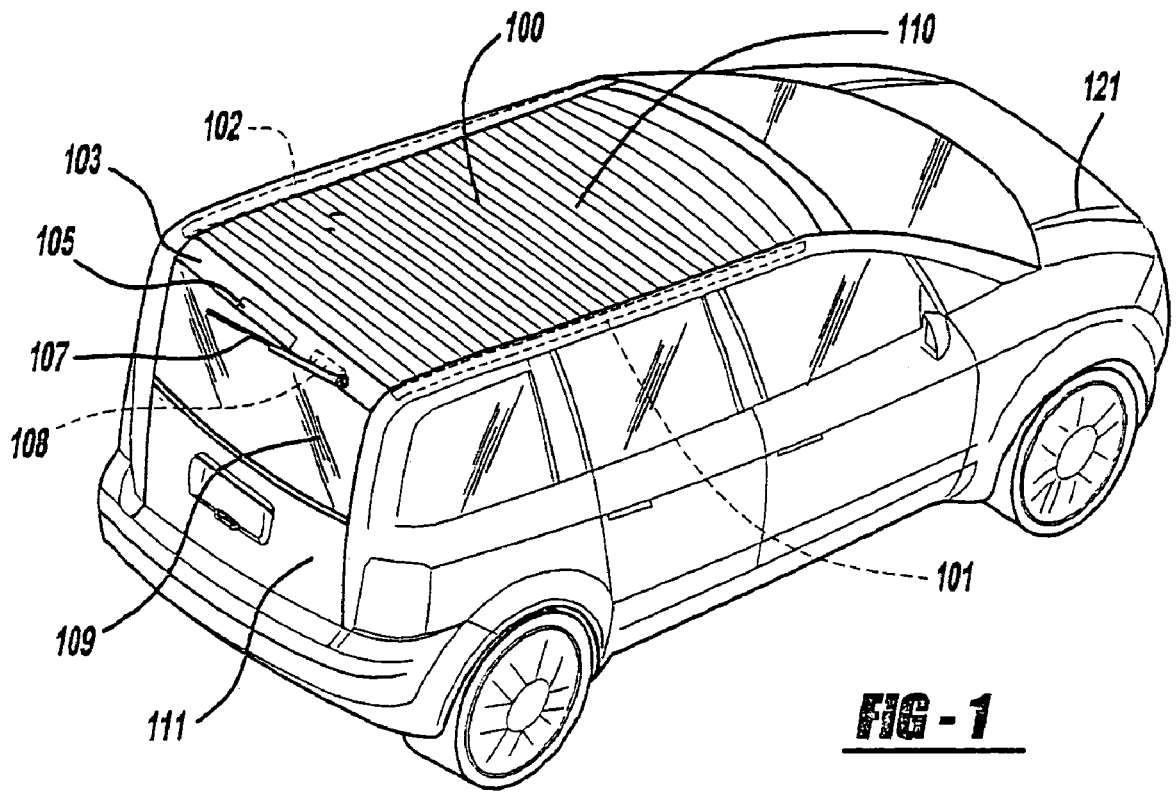
FIG. 1 is a rear perspective view showing a first preferred embodiment of an automotive vehicle open air system of the present invention with the roof in a closed position.
Figure 2:
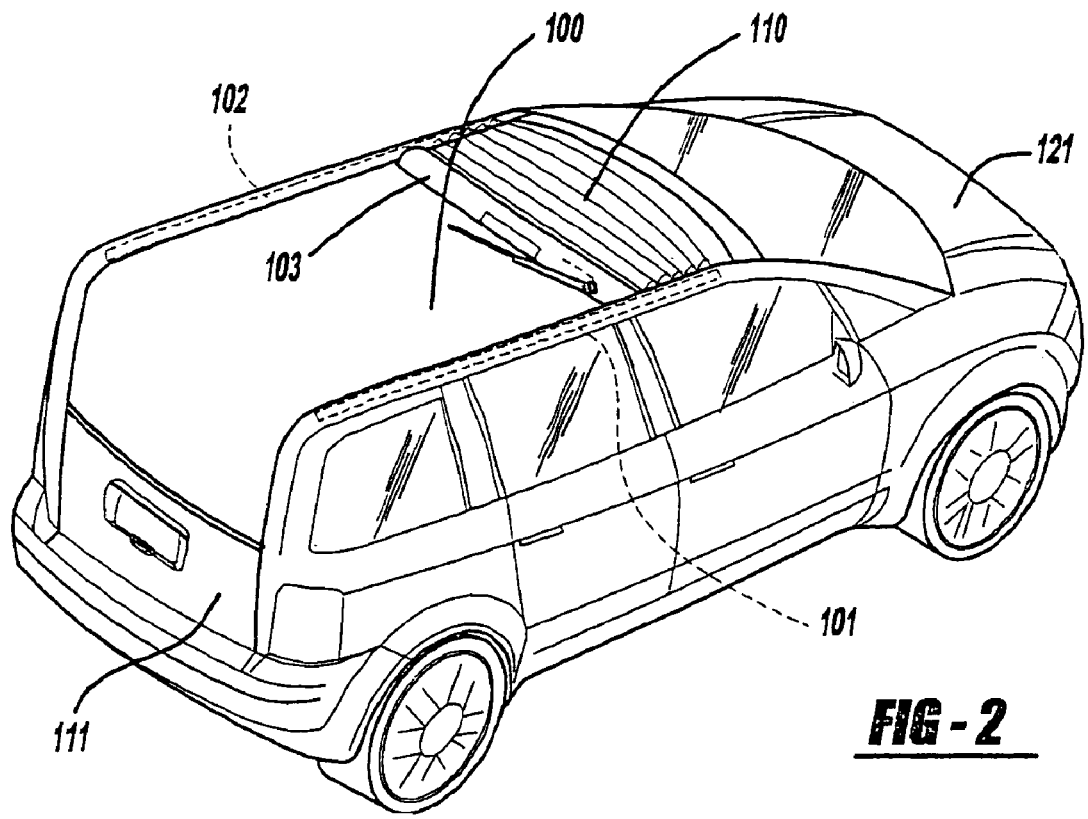
FIG. 2 is a rear perspective view of a first preferred embodiment of the present invention with the roof open from the rear showing the movement of the attached rear header.
Figure 3:
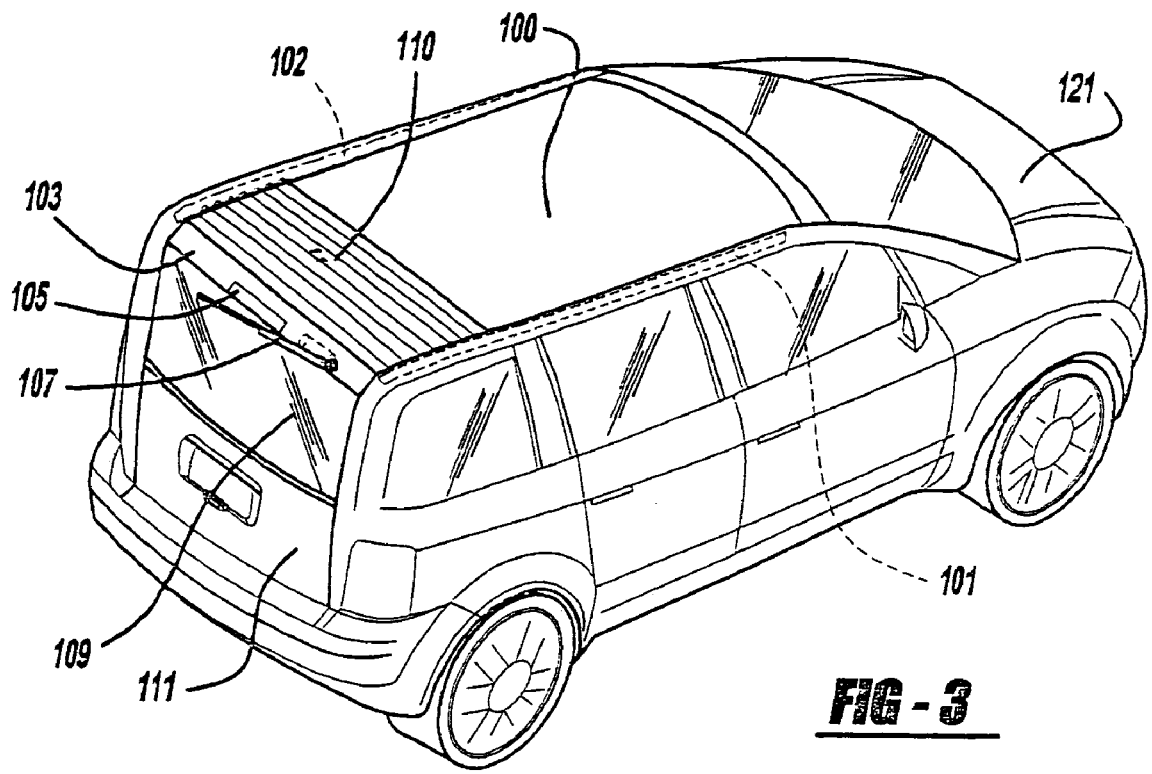
FIG. 3 is a rear perspective view showing a first preferred embodiment of the present invention with the roof in an open position from the front.
Figure 4:
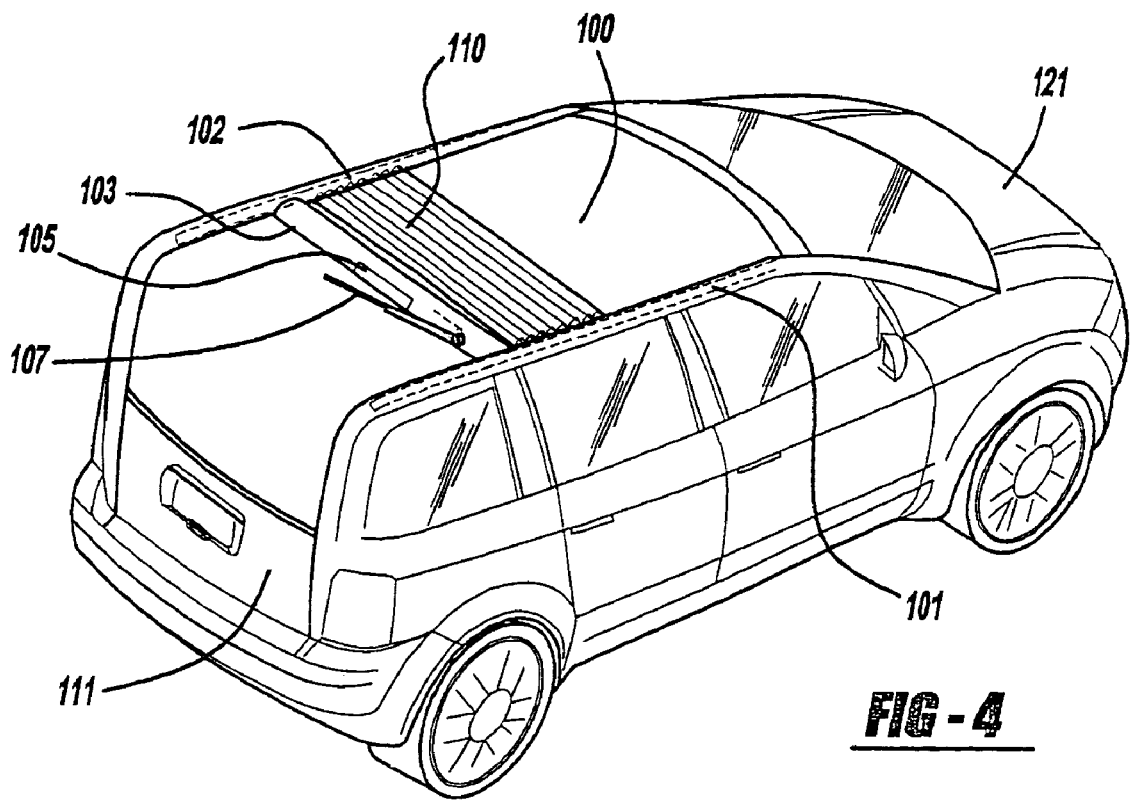
FIG. 4 is a rear perspective view showing a first preferred embodiment of the present invention with the roof open with movement from the front and from the rear header.

Referring to FIGS. 1-4, an automotive vehicle 121 has a first preferred embodiment of an open air system 100 of the present invention which includes a flexible and movable surface 110 which is spanned between a pair of parallel tracks 101, 102 and has a rear header 103 attached to the movable and flexible surface 110. In various embodiments, rear header 103 includes a stop light 105. In various embodiments, rear header 103 includes a rear windshield wiper 107 that may comprise a powered motor 108. In some embodiments of the present invention, tracks 101, 102 may include a power strip and header 103 may include an electrical connection to the power strip so that an electric feature such as stop lamp 105 may be powered in any open position of roof 110. Header 103 is essentially hollow and may be fabricated from metal, plastic, carbon fiber and combinations thereof. FIG. 1 illustrates open air system 100 in a closed position in which the entire interior of automotive vehicle 121 is protected from the outside elements. FIG. 2 shows open air system 100 open from the rear with rear window 109 retracted into tailgate 111. In this position, roof 110 is moved from the closed position to a forward position by an electrical powered means. Such electrically controlled movement of a flexible roof includes an actuator which may control cables, belt drive, a screw drive, a Bowden drive or other drive devices. See, for example, U.S. Pat. No. 5,152,577 to Omoto et al. issued Oct. 6, 1992; U.S. Pat. No. 6,161,893 to Ewing et al. issued Dec. 19, 2000; and U.S. Pat. No. 5,169,206 to Omoto et al. issued Dec. 8, 1992; U.S. Pat. No. 4,085,965 to Schlapp issued Apr. 25, 1979; U.S. Pat. No. 4,671,565 to Grimm et al. issued Jun. 9, 1987; and U.S. Pat. No. 5,015,030 to Detloff issued May 14, 1991; and U.S. Pat. No. 5,018,783 to Chaming et al. issued May 28, 1991. FIG. 3 shows the open air roof system 100 opened from the forward position, thus exposing the driver and passenger to the open air. FIG. 4 shows the open air system 100 moved from both the forward position and rear position exposing both the cargo and the passenger areas to open air.

Figure 5:
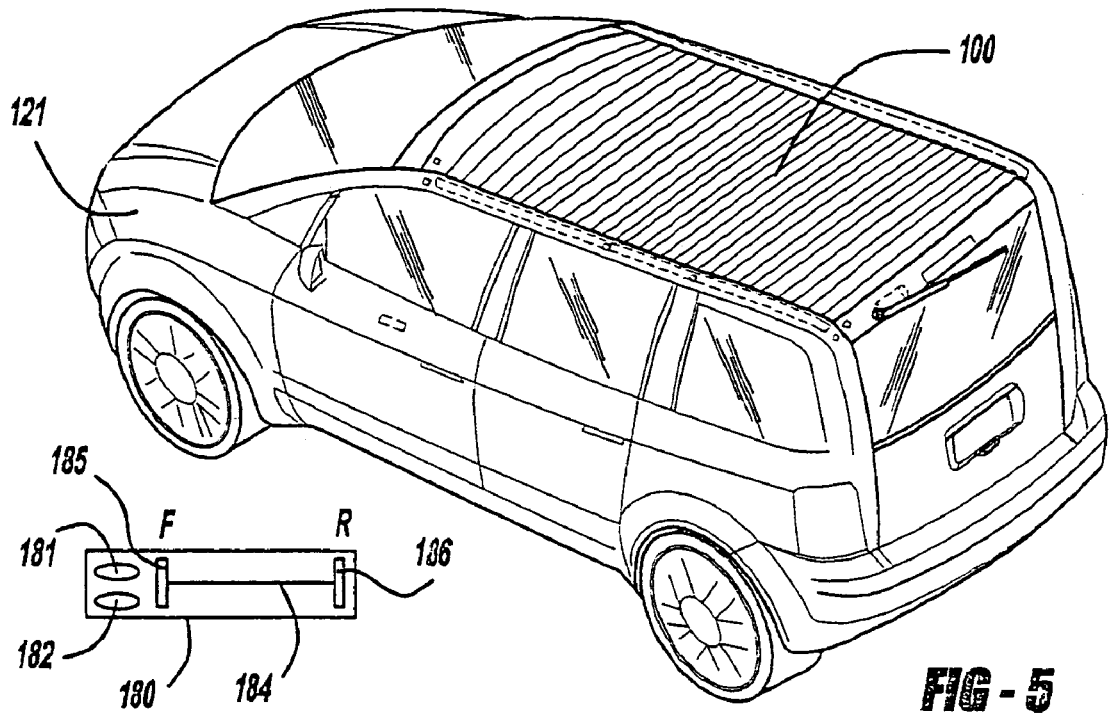
FIG. 5 is a representation of a control system controlling the open air system, shown in a closed position.
Figure 6:
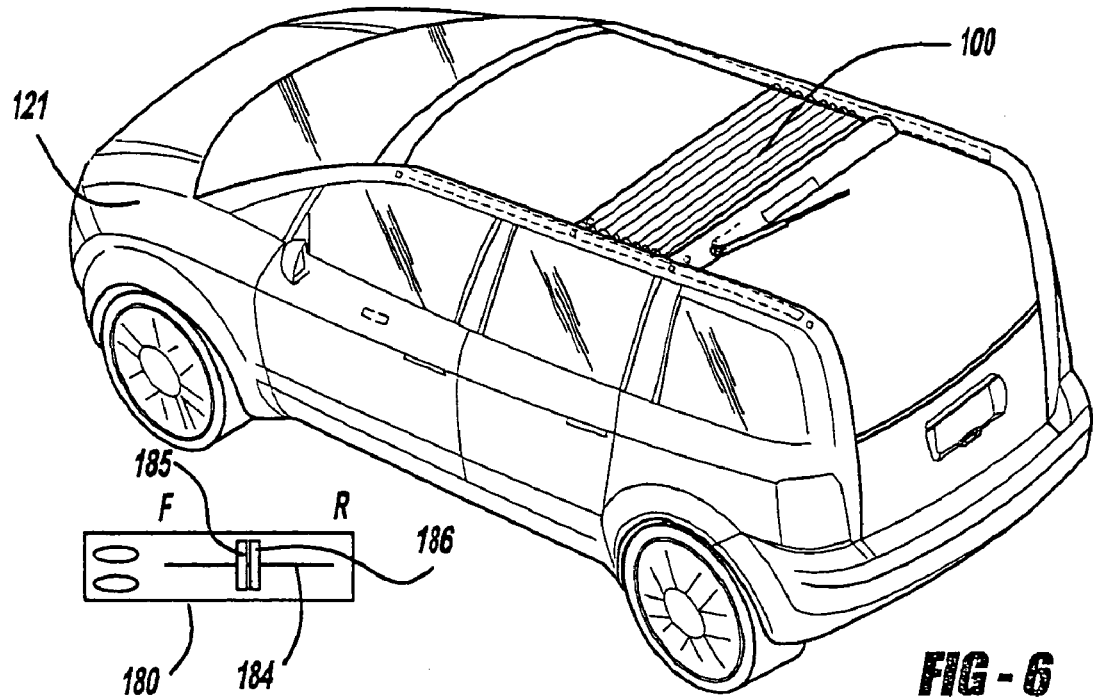
FIG. 6 is a representation of a control system controlling the open air system, shown open from the front and the rear.
Figure 7:
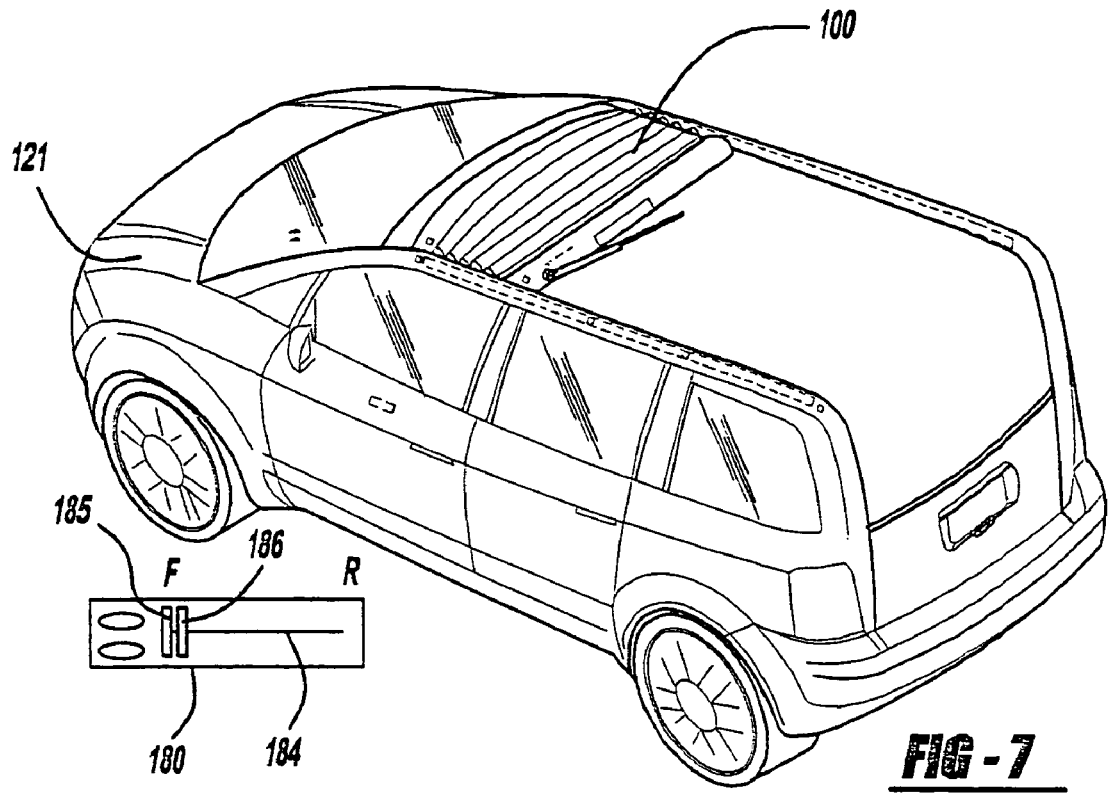
FIG. 7 is a representation of a control system controlling the open air system, shown open from the rear.
Figure 8:
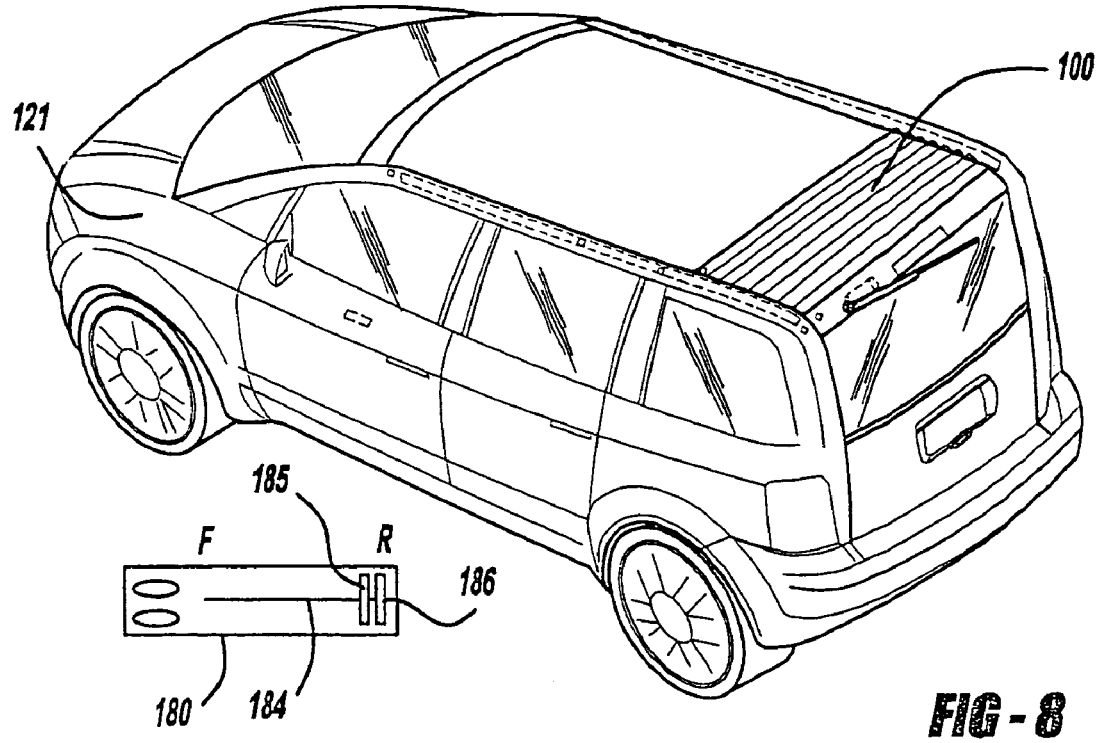
FIG. 8 is a representation of a control system controlling the open air system, shown open from the front.

Referring to FIGS. 5-8, automotive vehicle 121 has open air system 100. Movement of open air system 100 is controlled by controller 180. Controller 180 includes a knob or other finger controller member 185, 186 which moves along line 184. Finger controllable member 185 moves the forward portion of open air system 100 while finger control member 186 controls the movement of the rear of open air system 100. Controller 180 may include memory buttons 181, 182 used to store favorite roof opening configurations in a memory and retrievable by pushing one of the memory buttons 181, 182. For example, memory button 181 may be programmed to have the roof opened from the front only, as shown in FIG. 8, while memory button 182 may be programmed to have the open air roof system 100 open from both the front and the rear, as shown in FIG. 6. By just pressing button 181, the roof goes into a configuration like FIG. 8 or by just pressing button 182, the roof goes into a configuration like FIG. 6. Controller 180 is designed to be intuitive so that movement of finger controlled members 185, 186 along line 184 is consistent with the opening of the roof. As shown in FIG. 5, front finger controlled member 185 is at one extreme of line 184 while other rear finger controlled member 186 is at the opposite extreme end of line 184 and controller 180 has the open air system 100 completely closed. Moving to FIG. 6, finger controlled members 185, 186 are both moved to the center of line 184 and, as shown, open air roof system 100 is open from both front and rear. FIG. 7 shows front finger control member 185 all the way at the extreme end of line 184 while rear finger control member 186 is moved toward front finger control member 185, thus controlling open air system 100 to open from the rear toward the front. Conversely, shown in FIG. 8, finger control member 185 is moved toward the rear finger control member at one end of line 184, and in such a configuration, open air roof system 100 is opened from the front of the vehicle toward the rear. These are just four examples on infinite other intermediate roof positions. Finger control members 185, 186 may be moved in an infinite number of positions. Controller 180 is a part of a programmable electronic control unit 216 (hereinafter "ECU"). Controller 180 may be part of subassembly 200. Controller 180 may be part of a subassembly in which the rear header is fixed. Controller 180 may be installed in a panel, dashboard, center console, overhead console, or any other location that may be convenient for the driver to access the controller 180. Although these figures show the use of controller 180 with an open air system with a moveable rear header, controller 180 is easily adaptable to an open air system similar having a fixed rear header. Controller 180 may control movements of such a roof, as shown in FIGS. 15-18.

FIGS. 9, 10, 13, 14 and 15 illustrates an open air system 100 of the present invention including a flexible and movable surface 220. Open air system 100 may be part of an automotive vehicle 121. Open air system 100 includes roof rack 211 and may additionally comprise air deflector 212 which may include lights.

Figure 9:
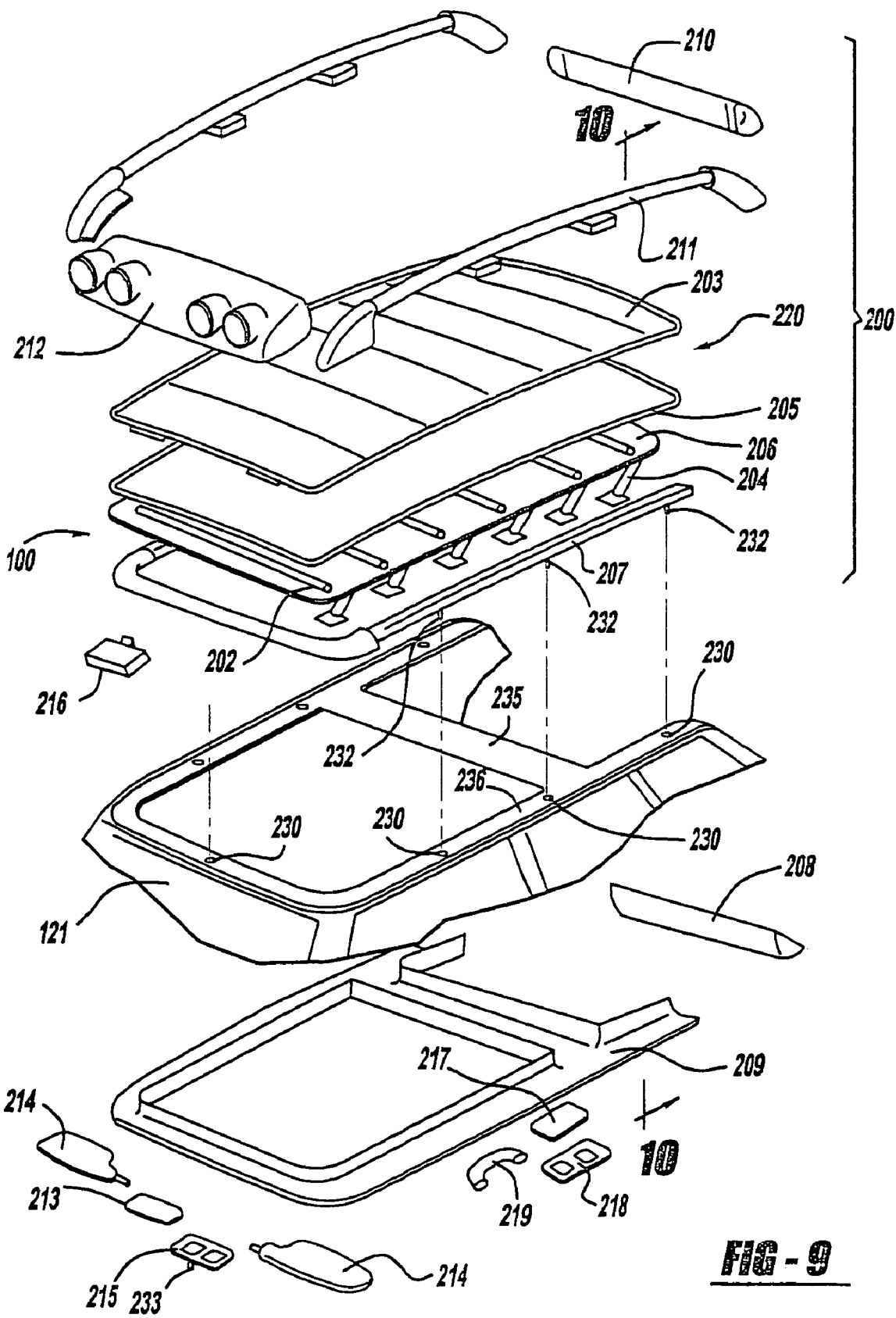
FIG. 9 is an exploded front perspective view showing the complete subassembly of the open air system of the present invention.

FIG. 9 shows a fragmentary view of a first preferred embodiment of subassembly 200 comprising open air system 100 of the present invention. Open air roof system 100 may comprise subsystem 200 comprising a roof panel 220 which may comprise a top cover 203, cross bows 202 and lift mechanisms 204 that fit into the track 207. Roof panel 220 includes padding 205 and a roof headliner 206. Roof panel components such as, for example, top cover 203, cross bows 207, lift mechanisms 204, padding 205 and roof headliner 206 is manufactured as a unit (roof panel 220). Roof panel 220 moves and folds along track 207. Track 207 may further include weatherstripping to prevent moisture and air from coming into the vehicle. Connected to roof panel 220 is a retractable rear header 210 and retractable rear header 210 includes trim piece 208. Rear header 210 moves with the roof panel 220. A rear stop light may be included in the retractable rear header 210. A wiper system may be included in retractable rear header 210. Roof rack 211 which may include stanchions which may further comprise cross car members and roof rack 211 may be connected to track 207. An air deflector 212 is connected to the track 207 as part of subassembly 200. Air deflector 212 includes lights. The movement of roof panel 220 is controlled by an electronic control unit (ECU) 216 and the ECU is part of the subassembly. ECU 216 controls the open air system 100 in all the open and closed positions as described above and in FIGS. 1-8. Subassembly 200 includes a movement mechanism for roof panel 202 along track 207. Examples of a movement mechanism may include but is not limited to generally rigid rods, pulley-type cables and Bowden cables. Gears of the motor directly contact a rack-like track, or a jack screw, tape drive or hydraulic mechanism. A movement mechanism includes two motors and four drive cables. In such embodiments, each motor is connected to two drive cables. In certain embodiments, the two motors are controlled by an ECU 216. A controller similar to controller 180 is utilized by an occupant of vehicle 121 to control the operation of the two motors and drive cables, thus controlling the opening and closing of roof panel 202. Subassembly 200 comprises an interior headliner 209 which is attached from inside vehicle 121. Additional parts or components are integrated into interior headliner 209 which is part of subassembly 200 such as, for example, a substrate 213 to connect other components, a forward light housing or reading/dome light 215, sun visors 214, handles 219 and/or a side light substrate 217 and light fixture 218. ECU 216 may include, for example, a compass, a thermometer, a travel computer, a GPS device, a Bluetooth interface, a cell phone device, an occupant satellite communication system, such as, for example, OnStar®, and/or a display device or screen. A DVD or other entertainment system may be integrated into the headliner. Integrating such components into a headliner is disclosed in U.S. Pat. No. 4,844,533 to Dowd, which issued Jul. 4, 1989 and is incorporated by reference herein.

Figure 10:
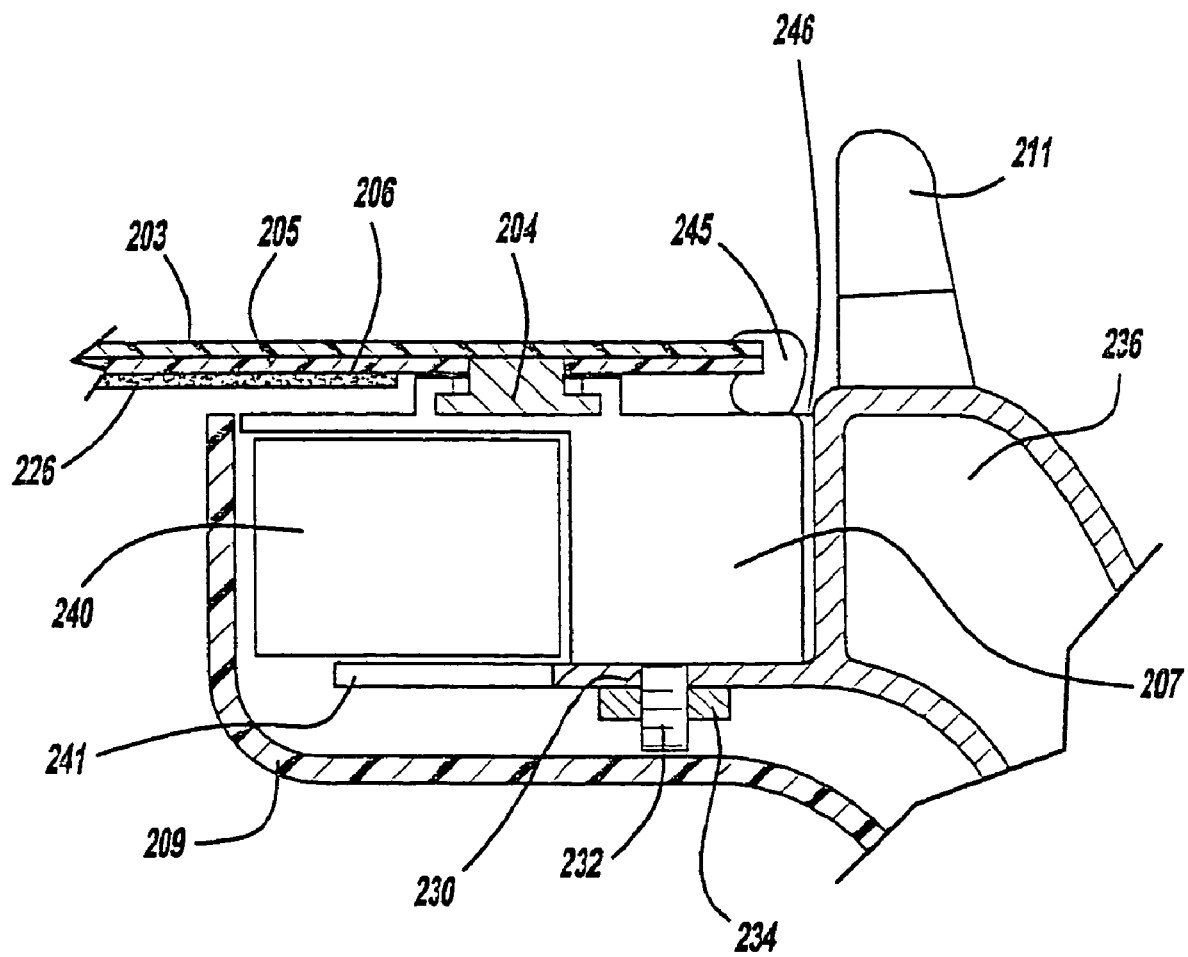
FIG. 10 is a cross sectional view taken along line 10-10 of FIG. 9 showing the preferred embodiment of open air system.

Referring to FIG. 10, a cross sectional view of FIG. 9 shows fastening member 232 inserted into hole 230 which has a flange that is part of frame 236. Fastening member 232 is then held in place using a standard fastener 234 such as a bolt, locking fastener, clip or the like. Subassembly 200 is put onto frame rail 236 during assembly and fastening member 232 and fastener 234 are replaced by a screw or the like which is fastened from the inside of the vehicle through hole 230 into rail 207. A side impact airbag 240 may be included. Side impact airbag 240 may include a motion sensor 241 so that airbag 240 is released if the vehicle 121 rolls over. Also shown in this cross sectional view is a seal 245 which seals open air system and vehicle interior from outside elements such as wind, moisture, rain, snow, dirt and the like. Additional trim and/or seals 246 may be necessary so that frame rail is sealed and has a finished and aesthetically pleasing look. Fastening member 232 may be a locator pin and fastener 234 may not be needed in such embodiments. Rather, subassembly 200 may be attached to vehicle 121 by using adhesive along the surface interface between tracks 207 and vehicle frame rail 236.

Figures 11A, 11B:
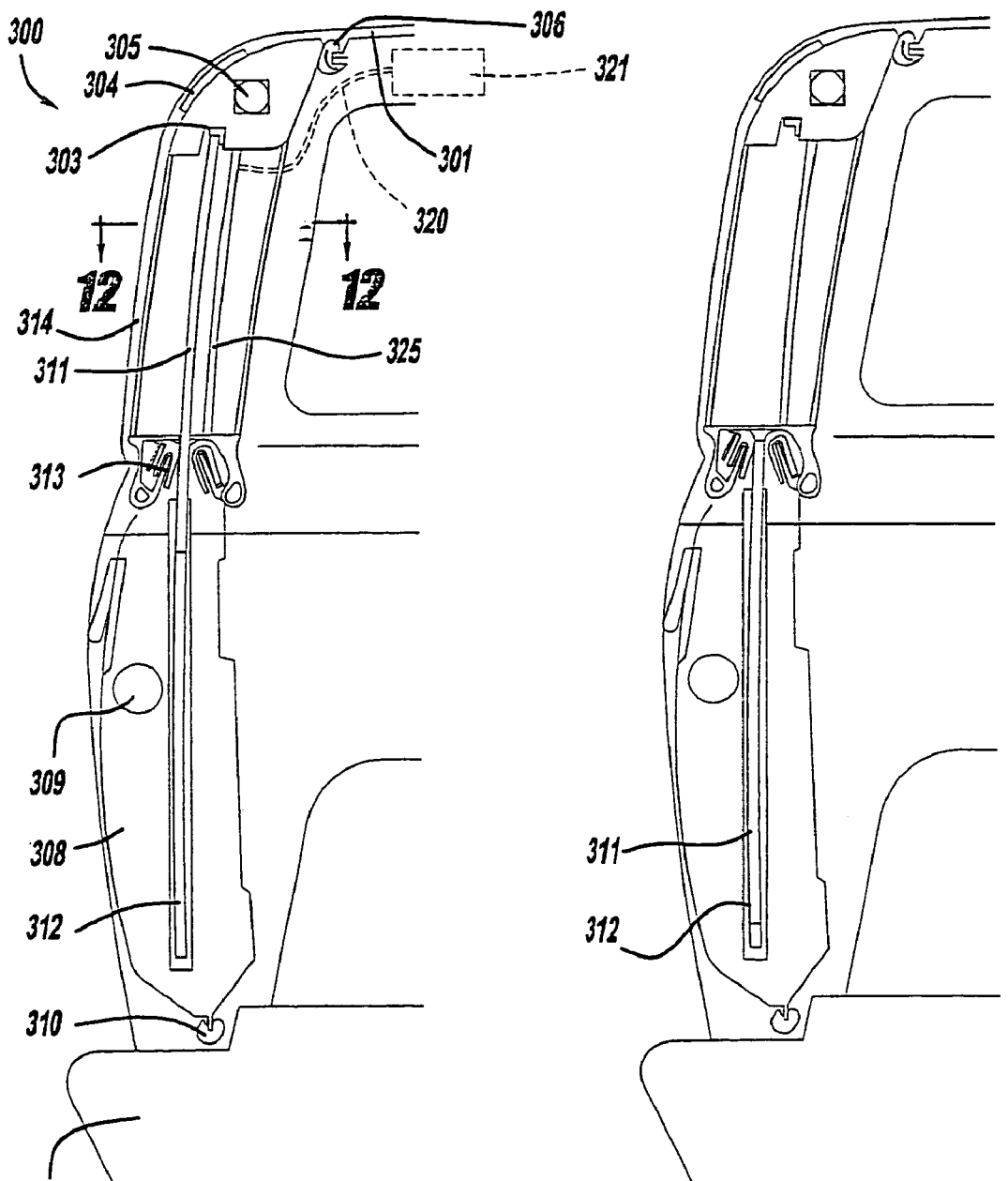
Figure 12:
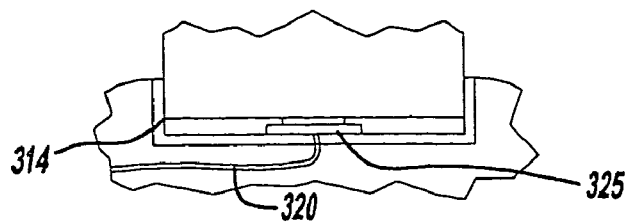
FIG. 12 is a fragmentary, diagrammatic view showing a rear header track employed in the first and the second alternative embodiments of the present invention.

Referring to FIGS. 11A, 11B, 11C, and 11D, a first and second alternate embodiment of the present invention are shown. Automotive vehicle 300 has a flexible, movable roof 301 which is moved by electronic and/or mechanical systems such as described herein. Movable roof 301 bufts up to rear header 303 and has a weatherstrip seal 306 to deter moisture and other elements that are not wanted in the interior of the vehicle. Rear header 303 includes a rear stop light 304. In a first alternative embodiment, rear header 303 may include a rear wiper system (not shown). To supply power to an electrical component in rear header 303, such as, for example, the rear stop light 304 and/or to a rear windshield wiper system, there is an electrical connection 305 which connects to a power strip in the track 314 in which the header 303 moves. As shown in FIG. 12, track 314 has a power strip 325 that is in contact with electrical connector 305. Power strip 325 may be connected to power supply 321 by pigtail 320. There is a mirror image of track 314 on the opposite side of the vehicle 300. The rear window 311 moves up and down in track 312 that is located in tailgate 308 and is moved by motor 309 or may be moved by a hand crank. A weatherstripping system 313 seals the inside of tailgate 308 from the outside elements. Tailgate 308 pivots on hinge 310 which is above the bumper 315. The tailgate is similar to a typical pickup truck tailgate. FIG. 11B shows the embodiments of FIG. 11A with the window 311 retracted into tailgate 308. In embodiments shown in FIG. 11C, the rear header 303 moves along track 314 into a recessed position 303A above the tailgate 308. In a second alternative embodiment similar to above, rear header 303 is replaced with a different header 350 which comprises roller 351 that attaches to flexible roof 352 and flexible roof 352 may be retracted into rear header 350 on roller 351. Roller 351 may be electrically controlled and may have an actuator connected to it. Rear header 350 and glass 353 can move similarly to rear header 303/303A that was described earlier. Other open air systems are described in U.S. Provisional Application No. 60/580,583 to Storc et al., filed on Jun. 17, 2004 and U.S. Application No. 11/154445 to Storc et al., entitled "Automotive Vehicle Open Air System", which was filed on Jun. 16, 2005, all of which are incorporated in their entirety.

Figure 13:
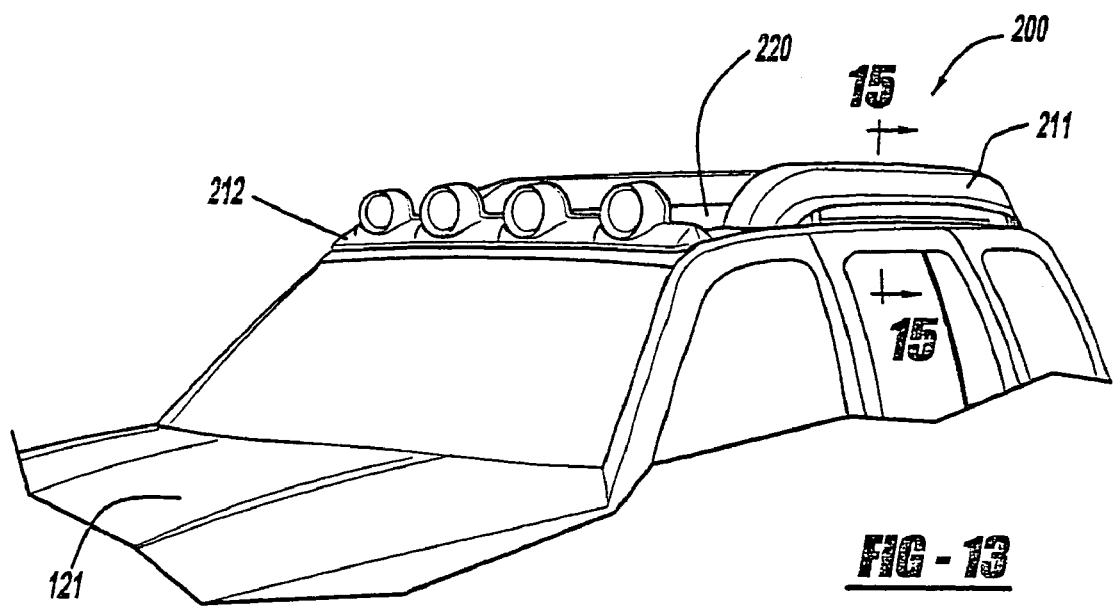
FIG. 13 is a front perspective view showing a completed subassembly of a third alternative embodiment of an open air system attached to a vehicle.
Figure 14:
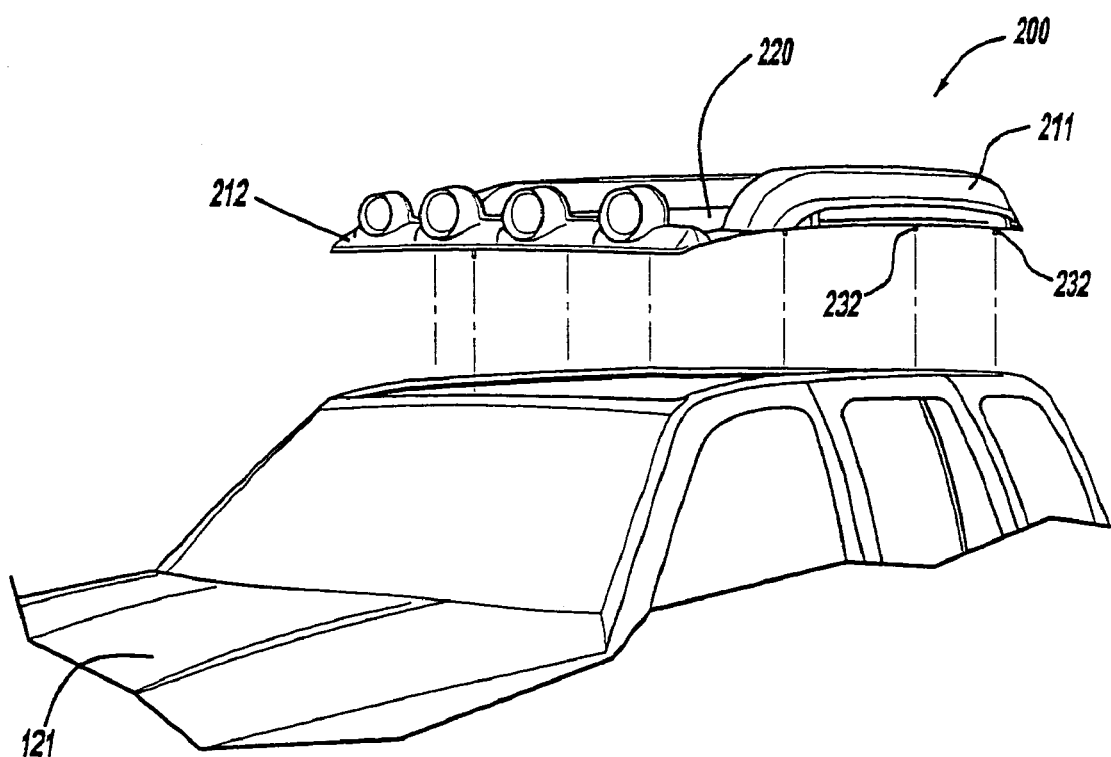
FIG. 14 is a partially exploded front perspective view showing the completed subassembly of a third alternative embodiment of an open air system.

With reference to FIGS. 13 and 14, the present invention include methods of manufacture of an open air system to a vehicle. An example of such manufacturing methods includes attaching subassembly 200 to vehicle 121. Attachment points 232 are illustrated and in some embodiments they may be locator pins and subassembly 200 may be bonded to vehicle 121 by any adhesive known to be strong enough for such application. Alternatively, attachment points 232 may include any fastener known in the art such as nut and bolt push pin push type fastener, rivet, weld point and the like that would be used for such assembly of subassembly 200 as a module to vehicle 121. The modular piece comprising subassembly 200 may be attached to vehicle 121 by both a fastening system and bonded by an adhesive. The assembly of the module comprising subassembly 200 to vehicle 121 includes the positioning of subassembly 200 above vehicle 121 on an assembly line, lowering subassembly 200 into position on vehicle 121 and fastening and/or bonding with adhesive to vehicle 121. Such embodiments may include interior headliner parts 209 which would come typically through the opening where the windshield would go and move up towards the interior roof portion for attachment to the vehicle 121. Interior headliner 209 may be attached by utilizing J-hooks. Examples of such headliner trim assemblies may include interior headliner 209. Interior headliner 209 may include other components as described in FIG. 9 which may be part of the module that is assembled. Roof module 200 may have similar roof assemblies which may not include flexible roof 220. For example, vehicle 121 may have the options of solid roof, roof with a sunroof, and open air system 100. These options may be provided to the assembly area by a single supplier and location pins 232 are common amongst all options. The use of locator pin 232 or fastener and/or adhesive bonding techniques are common amongst all options. Headliner components may be common amongst all options and accessory components such as DVD players, digital compasses, occupant communication devices and the like may be included or deleted as part of interior headliner 209, depending on customer's order.

Figure 15:
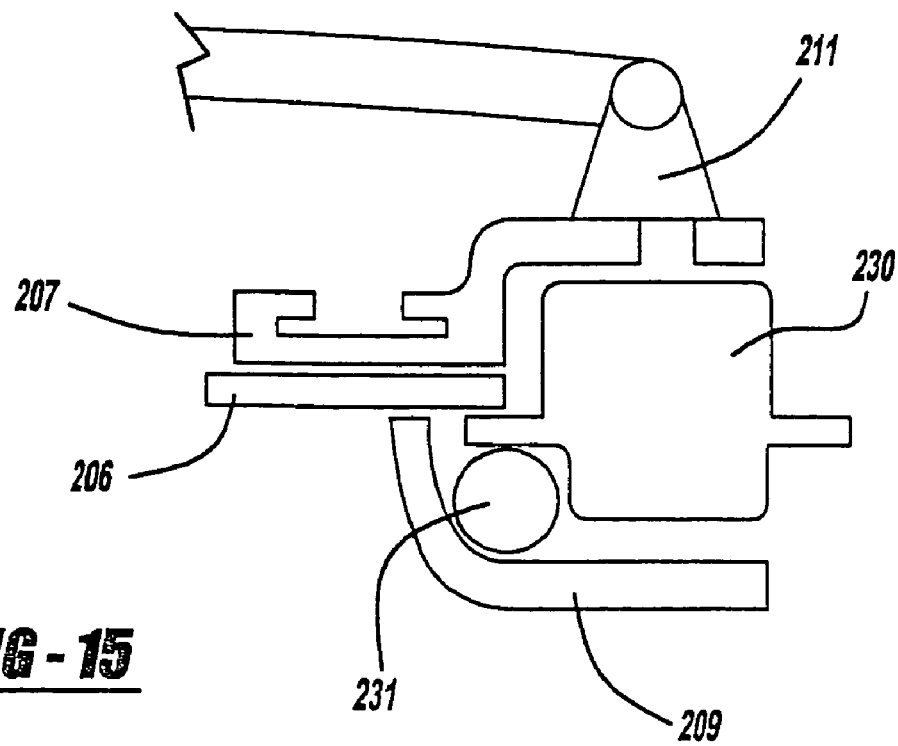
FIG. 15 is a cross sectional view taken along line 15-15 of FIG. 13 showing the third alternative preferred embodiment of an open air system.

Referring to FIG. 15, a cross sectional view of FIG. 13 shows an embodiment of the subassembly 200 comprising track 207 with a roof rack member 211 attached. Subassembly 200 is attached to body frame 230. Such attachment of subassembly 200 to body frame 230 includes a fastener such as, for example, a screw, a nut and bolt, a bullet push on fastener, a lock tight fastener, a rivet, a weld, an adhesive or combinations thereof. Roof headliner 206 runs below the track and is attached to the roof panel 220. Interior headliner 209 may be attached to track 207. A side impact airbag 231 may be installed between interior headliner 209 and the body frame 230. Alternatively, fastening member 232 may be a locator pin and fastener 234 may not be needed. Rather, subassembly 200 may be attached to vehicle 121 by using adhesive along the surface interface between tracks 207 and vehicle frame rail 236.

Figure 16:
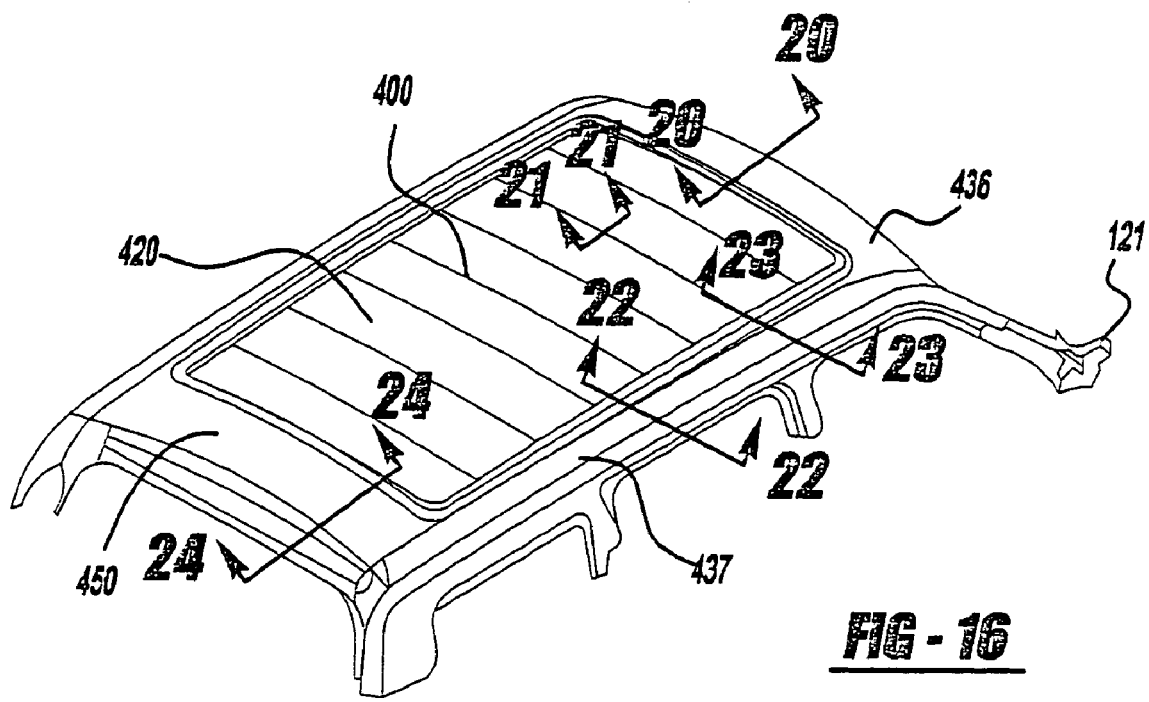
FIG. 16 is a rear perspective view showing a preferred embodiment of an open air system in a fully closed position.
Figure 17:
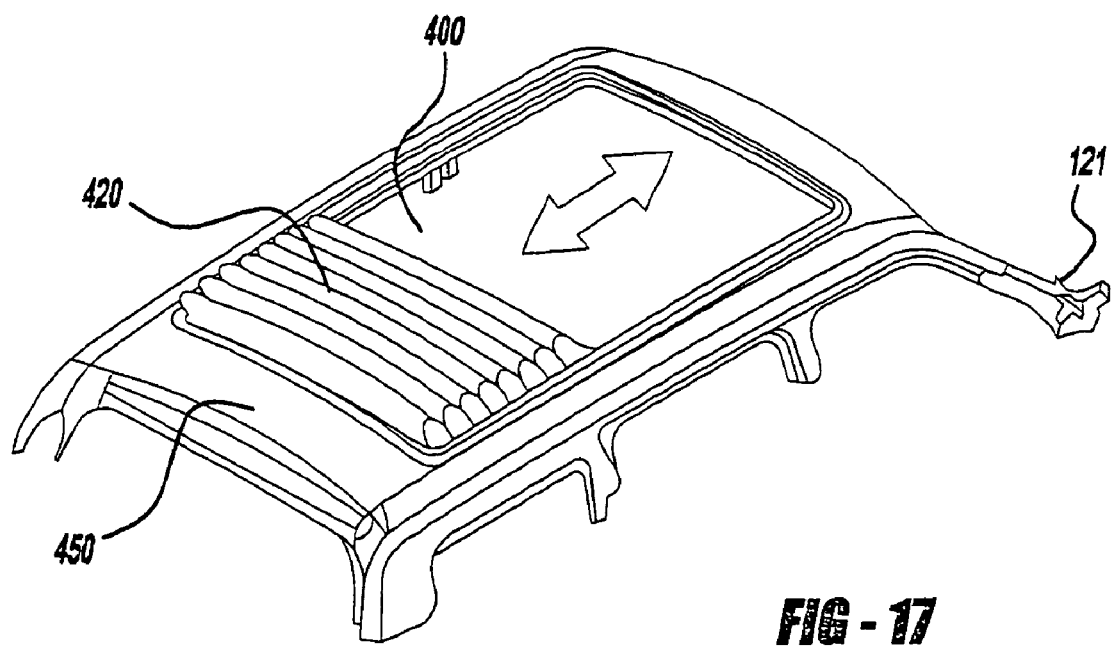
FIG. 17 is a rear perspective view of the second preferred embodiment showing the open air system opening from the front.

Now referring to FIGS. 16-19, a second preferred embodiment of an open air system 400 is illustrated. In the second preferred embodiment, open air system 400 is very similar to first preferred embodiment open air system 100 except that rear header 450 is attached to and is part of automotive vehicle 121 and rear header 450 is not moveable, but rather rear header is fixed to vehicle body. Movement of open air system 400 is controlled by controller 180 as described above. FIG. 16 shows open air system with moveable roof 420 in a closed position and is controlled by controller 180 in a configuration as shown in FIG. 5. As shown in FIG. 17, roof 420 is opened from the front of vehicle 121. The opening as illustrated in FIG. 17 is controlled by controller 180 in such a configuration as shown in FIG. 8. Moving to FIG. 18, open air roof system 400 is shown with roof 420 opened from the rear of vehicle 121. When roof 420 is opened from the rear, the rear header 450 does not move. Vehicle 121 may have a cross car member 452 to add stability to the frame of vehicle 121. Roof 420 that is opened as shown in FIG. 18 is controlled with controller 180 in a position as shown in FIG. 7. FIG. 19 shows open air roof system 400 with roof 420 opened from the front and from the rear. The opening as illustrated in FIG. 19 is controlled by controller 180 in such a configuration as shown in FIG. 6.

Figure 27:
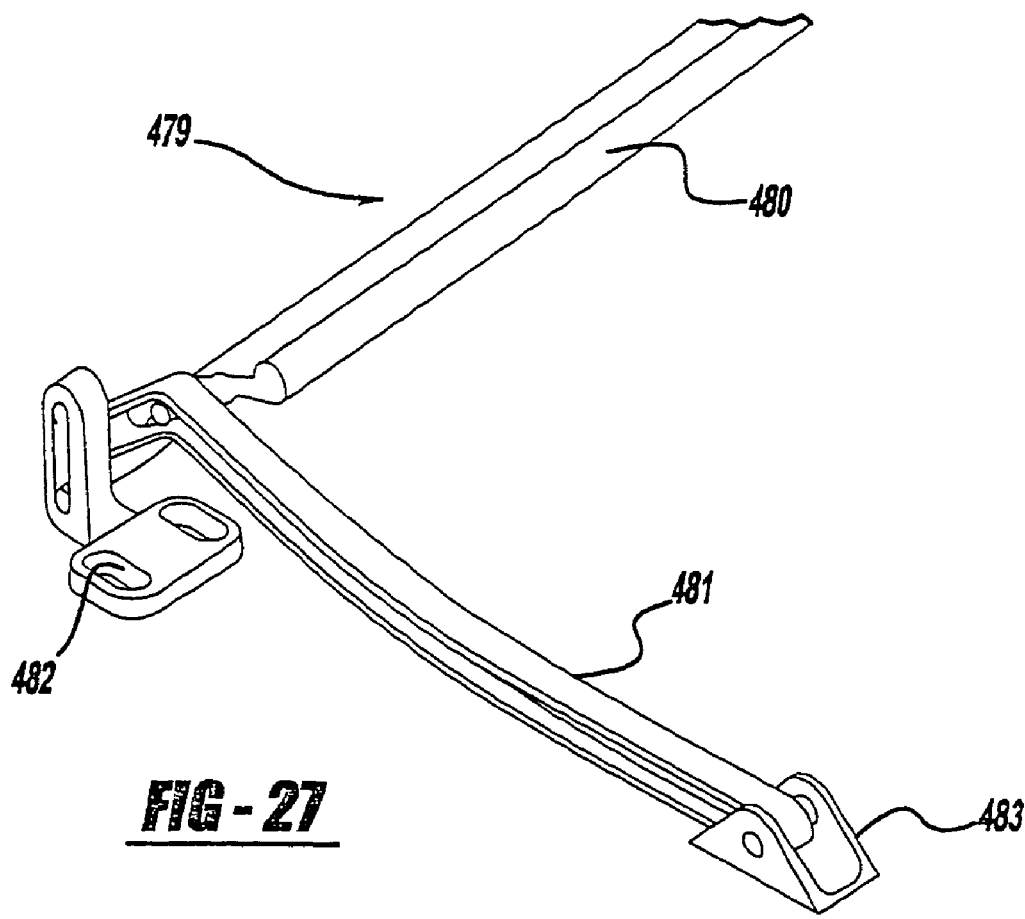
FIG. 27 is a perspective view of a preferred embodiment of a wind deflector.
Figure 49:
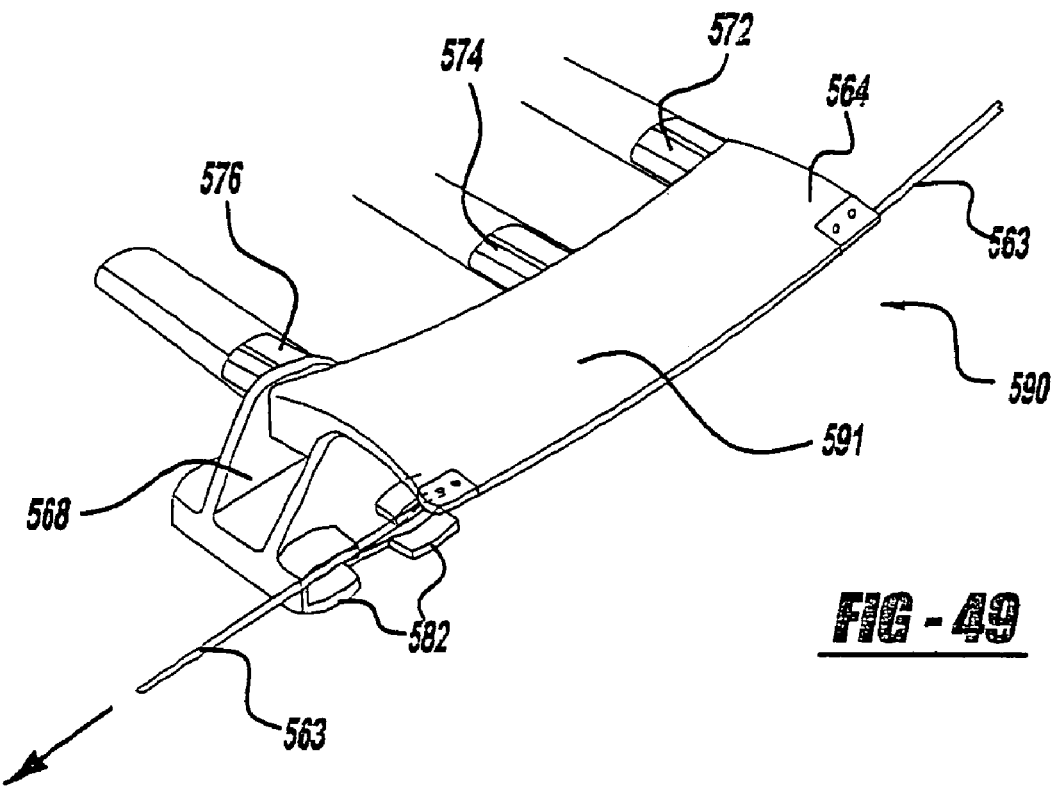
FIG. 49 is a perspective view of the fourth preferred embodiment of the lift arm mechanism.
Figure 29:
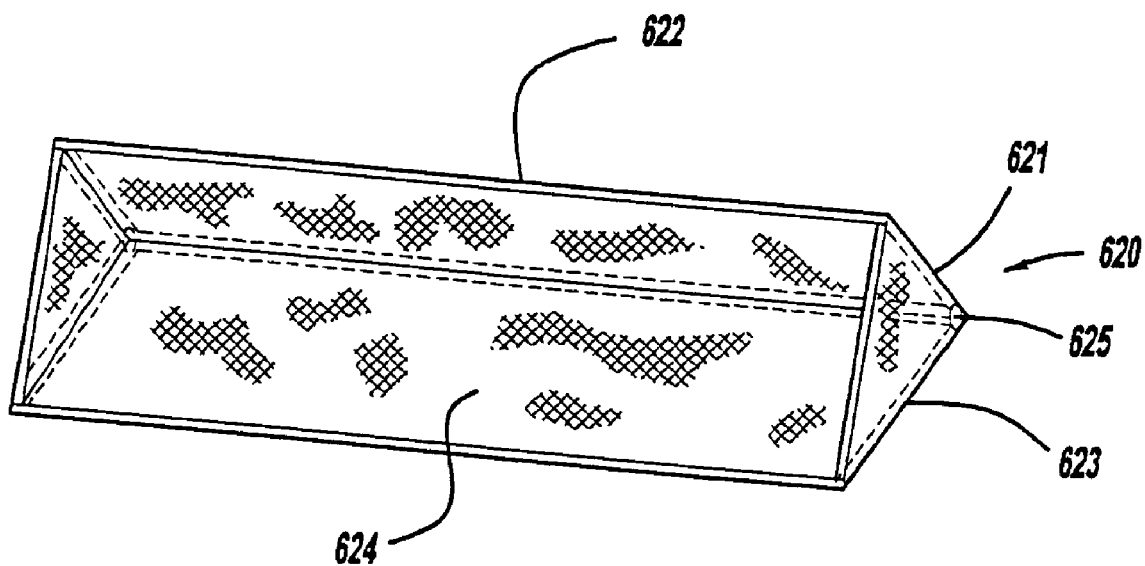
FIG. 29 is a perspective view of a second alternative embodiment of a wind deflector.

Shown in FIG. 20, is a cross sectional view of FIG. 16 along line 20-20 of front header 436. Although this cross sectional view is of the front of the roof, the same cross sectional view can be drawn for the rear header of the roof. Roof 420 engages seal 430 when roof is closed, thus forming a seal deterring wind, moisture, dirt and other environmental stresses from entering interior of vehicle when roof is closed. Roof system 400 is attached to vehicle frame 436 by the fastening of slide rail 444 which is fastened by fastener 432 though hole 439 of frame 436. Fastener 432 may be a bullet push on fastener, a lock tight fastener, a screw, a bolt, a rivet, a weld or any such fastener known to one skilled in the art. Roof system 400 is attached to vehicle frame 436 by an adhesive 438. In such alternatives, member 432 is a pin that is aligned in hole 439 for proper alignment of roof system when bonded to vehicle frame 436 by adhesive 438. Additionally, roof system 400 may be attached to vehicle frame using both a fastener 432 and adhesive 438. End bow 434 includes fastener 433 which holds outer surface 431 of roof 420 at point 435. In the cavity area 442, a wind deflector, such as the example as shown in FIGS. 27, 28 and 29, may be positioned for application on the front header so that wind is deflected from the interior of the vehicle when the roof 420 is open. In area 440, an ECU unit such as 216 and/or controller such as controller 180 may be located for controlling the open air system 400.

FIG. 21A shows a cross section of an alternative embodiment of cross bow 450 which may be fabricated from aluminum, plastics, carbon fiber, alloys or the like. Cross bow 450 is partially wrapped by a fabric listing strip 453. Cross bow 450 is topped by an outer surface 431 of roof 420. The bottom of the cross bow 450 is wrapped in a layer of PVC 454. Roof 420 may be finished on the interior side with a headliner 452 and such headliner 452 may be designed to match the interior of the vehicle. Between the top surface 431 and headliner 452 may include padding 451. Such padding 451 is advantageous to dampen sound as well as retain heat or air conditioning, thus providing a more comfortable environment for occupants of the vehicle.

FIG. 21B shows a cross section of a preferred embodiment of cross bow 450 which may be fabricated from aluminum, plastic, carbon fiber, alloy or the like. Headliner material 452 includes seam 455 that creates pocket 456 around cross bow 450. Pocket 456 attaches cross bow 450 to roof 420. Roof 420 includes outer surface 431 which is designed to withstand the elements and keep the vehicle dry inside. Roof 420 also includes padding 451. Such padding 451 is advantageous to dampen sound as well as retain heat or air conditioning, thus providing a more comfortable environment for occupants of the vehicle. Headliner 452 may be designed to match the interior of the vehicle.

Referring to FIG. 22, illustrated is a cross sectional view along line 22-22 of vehicle side rail 437 and roof 420 shown in FIG. 16. Roof system 420 is in operable contact with seal 430 with assistance from tension cable 469, thus deterring outside elements such as wind, rain, snow, dirt, and the like from entering interior vehicle when roof 420 is closed. Roof 420 has an outer surface 431 and padding 451. Various embodiments of lift mechanism comprising arm 464 and slider 465 are detailed in FIGS. 33-37. Open air system 400 is fastened by the fastening of rail system 444 to side vehicle rail 437 by a fastener 461. Alternatively, roof system is attached to vehicle frame using both a fastener 432 and adhesive 438. Open air roof system 400 may include headliner 452 which engages with interior trim piece 460 and may be designed to give the interior a finished and aesthetically pleasing look.

Figure 23:
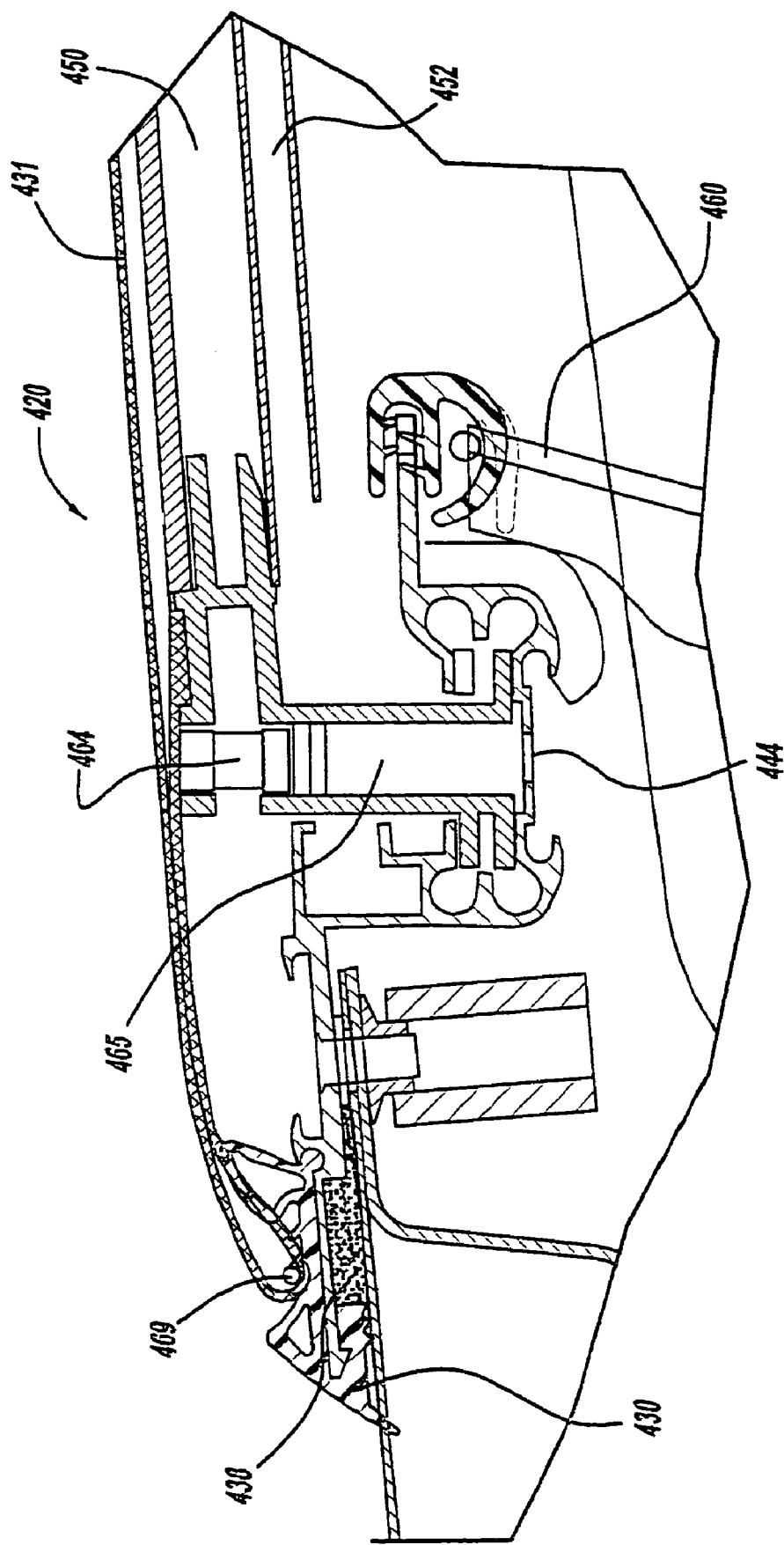
FIG. 23 is a cross sectional view taken along line 23-23 of FIG. 16 showing the second preferred embodiment of the open air system.

FIG. 23 is a cross sectional view along line 23-23 of FIG. 16 along a cross bow area along side rail of vehicle. Cross bow 450 is attached to lift mechanism arm 464 and headliner 452 is below cross bow 450. In some embodiments, cross bow 450 is attached to roof 420 as described in FIG. 21A. In other embodiments, cross bow 450 is attached to roof 420 as shown in FIG. 21B. In still other embodiments, cross bow 450 may be attached to roof 420 in such a way as described in U.S. Patent Application Publication No. 2004/0135404.

Figure 24:
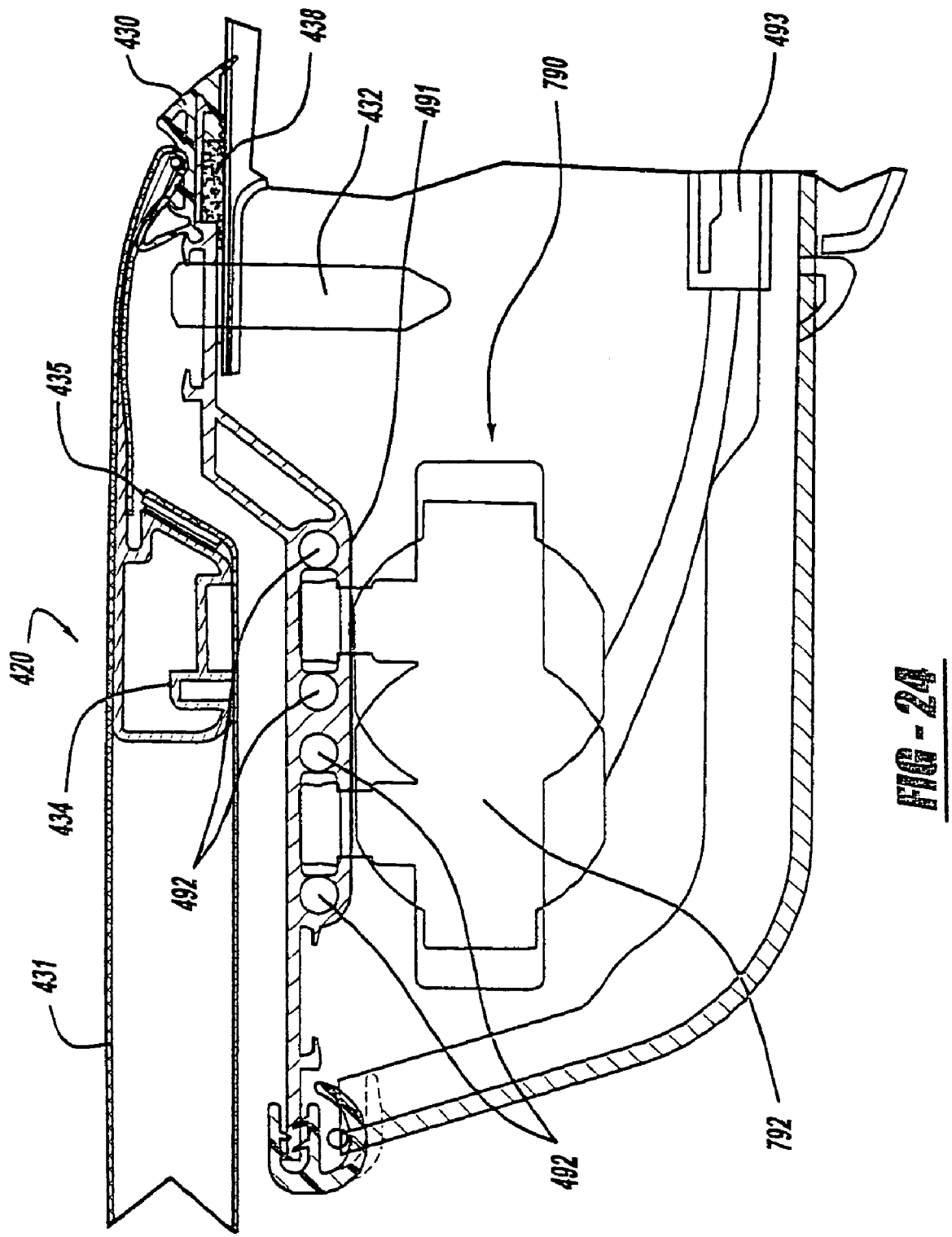
FIG. 24 is a cross sectional view taken along line 24-24 of FIG. 16 showing the second preferred embodiment of the open air system.

With reference to FIG. 24 which is a cross sectional view of FIG. 16 along line 24-24, a drive mechanism 790 for moving roof 420 is shown. In this example, drive mechanism 790 is located in rear of automotive vehicle 121. Drive mechanism 790 couples to cable housing 491 and includes at least one motor 792. In the case of roof 420 being able to be opened from the front and the rear simultaneously, at least two motors 792 are necessary. Drive control mechanism 790 may include an ECU 493. ECU 493 may include express open and express close options and may control prevention of pinching a finger in the closing of the roof. Drive control mechanism 790 controls cam which runs along drive cable 792 which is flocked along a drive link 486. Drive cables 492 are operably connected to sliders or lift mechanism and to motors such that sliders move based on movement of motor. Motor has a home position and may reset home position when roof is closed. Alternatively, subassembly 200 may comprise a movement mechanism for roof panel 420 along track 444. Examples of a movement mechanism may include but is not limited to generally rigid rods, pulley-type cables, Bowden cables as well as gears of the motor that may directly contact a rack-like track, a jack screw, tape drive or hydraulic mechanism. Preferably, a movement mechanism includes two motors and four drive cables.

Figure 25:
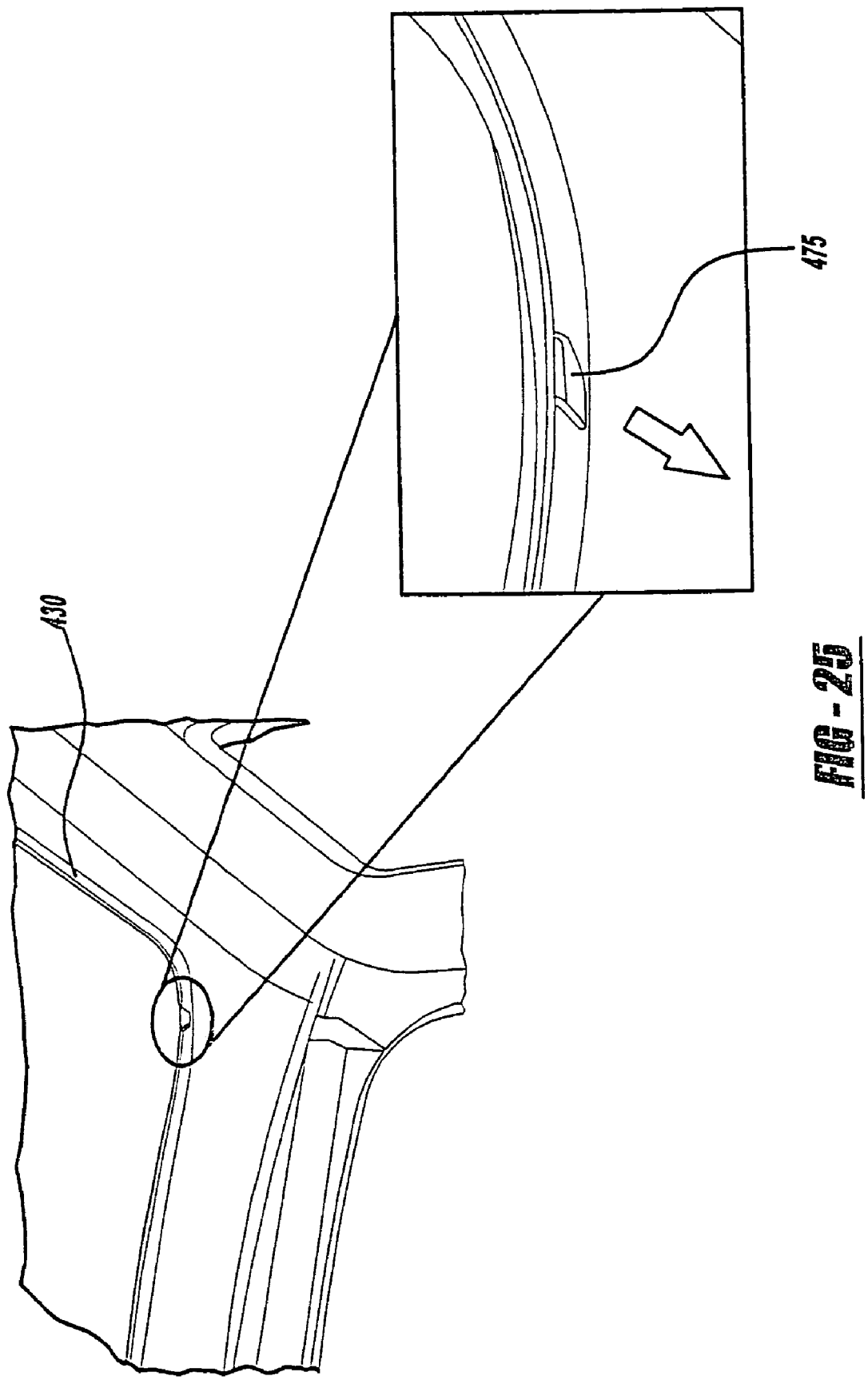
FIG. 25 is a detailed perspective view of FIG. 18 showing water management system.

Referring to FIG. 25, seal 430 may include a drain 475. Water flows away from open air system 400 as indicated by the arrow. Seal 430 is a double bulb seal. Alternatively, seal 430 is a single bulb with an elbow. Seal 430 may include a drain trough and the drain trough may be between two bulbs of the seal. Seal 430 may include a trough for edge of roof 420 along tension cable 469.

Figure 26:
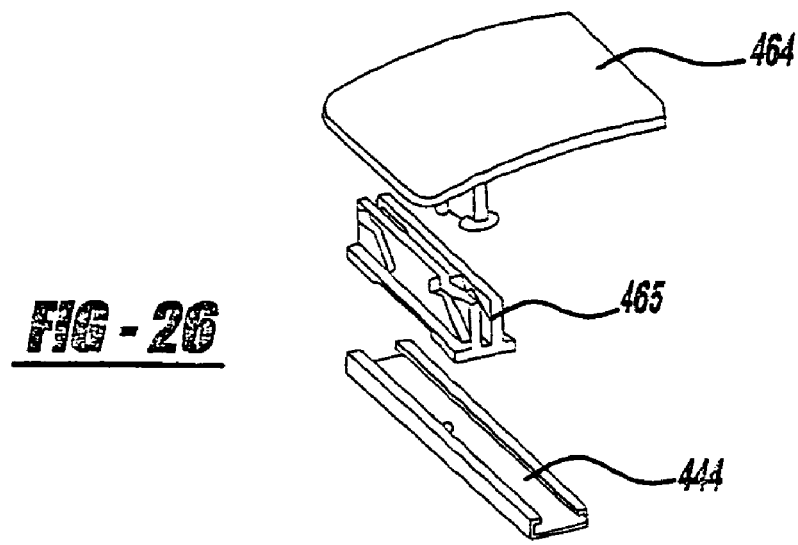
FIG. 26 is an exploded perspective view of an alternate embodiment of bow and plate assembly.
Figure 43:
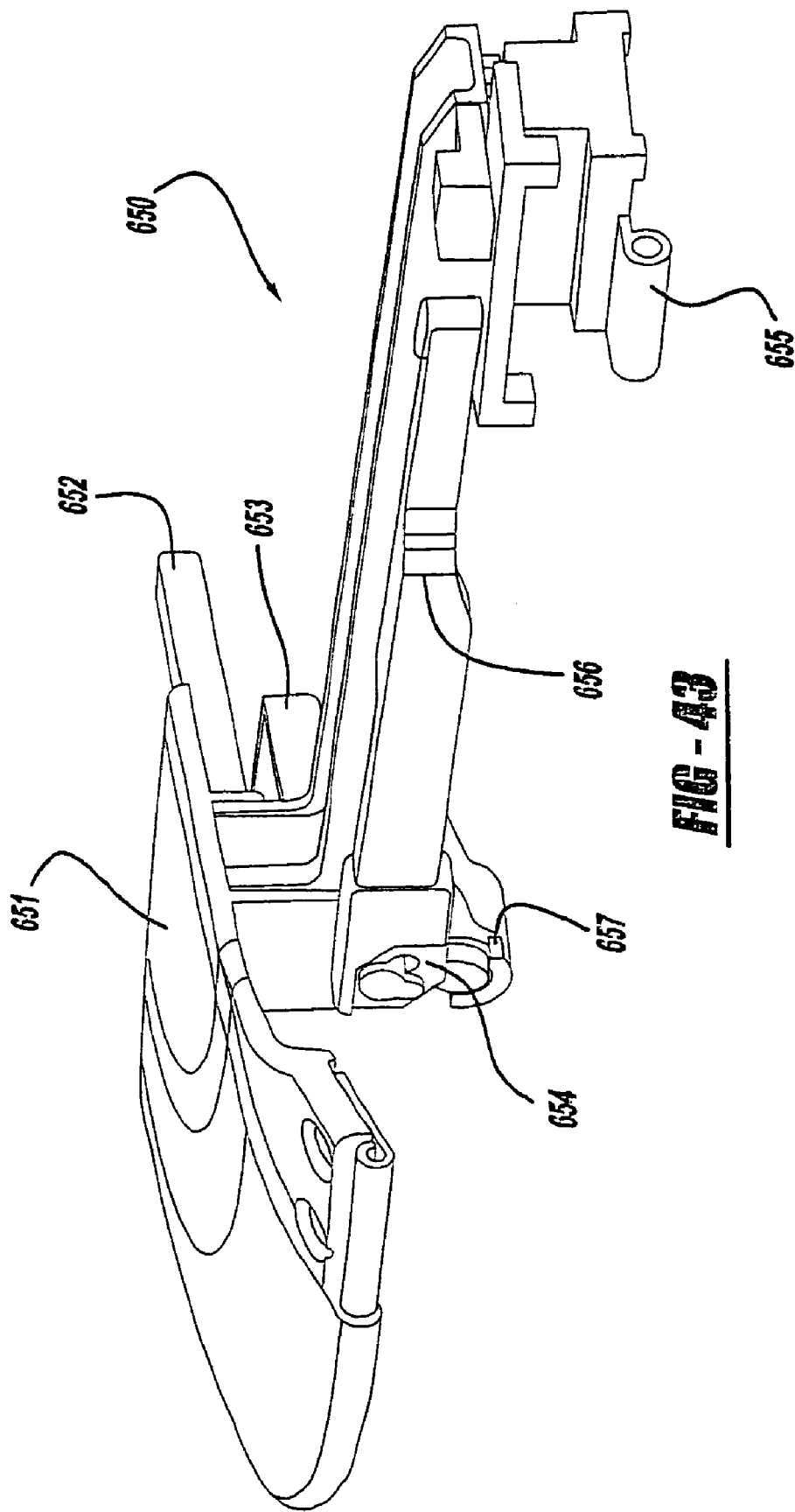
FIG. 43 is a perspective view of a preferred embodiment of end bow cap.

Referring to FIG. 26, an alternative embodiment of an end cap for an end bow assembly 464 includes a cam 465 which runs along guide track 444. When drive cables pull cam 465, it lifts end cap 464, thus lifting end bow piece away from seal and allows for movement of roof from a closed position to an open position. In a preferred embodiment illustrated in FIG. 43, end cap assembly 650 for end bow includes end cap 651 which includes connecting pieces 651 which attaches to an upper end bow member 660 and 653 which connects to a lower end bow member 661. Upper 660 and lower 661 end bow members connect to a mirrored image of end cap assembly 650 which is across the vehicle. End cap mechanism 651 also includes a connection to drive cable connector 655 to a drive cable arm 656, a pivot point 654 which may include a bias and a locking member 657. When opening roof, drive pulls end cap assembly 650 at connector 655. This action moves locking mechanism 657 from a depression onto track, thus raising end cap 651 and its end bow away from seal and allowing movement of roof into an open position.

Figure 52:
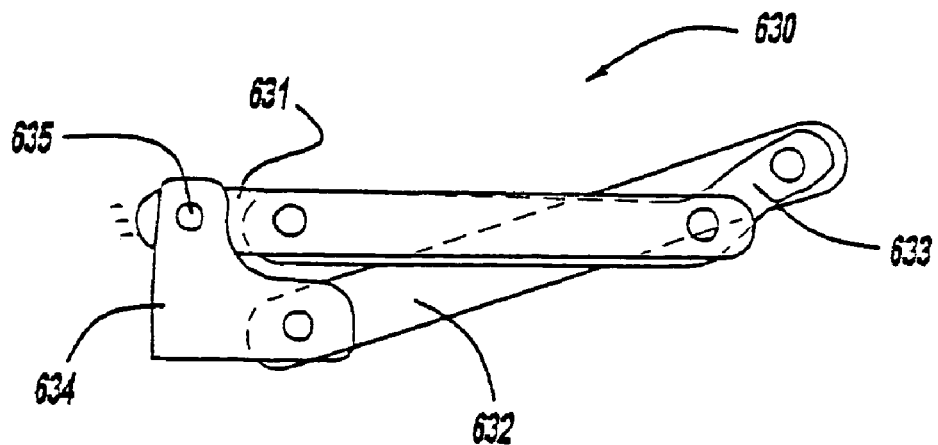
FIG. 52 is side view of a third alternative wind deflector in a closed position.
Figure 53:
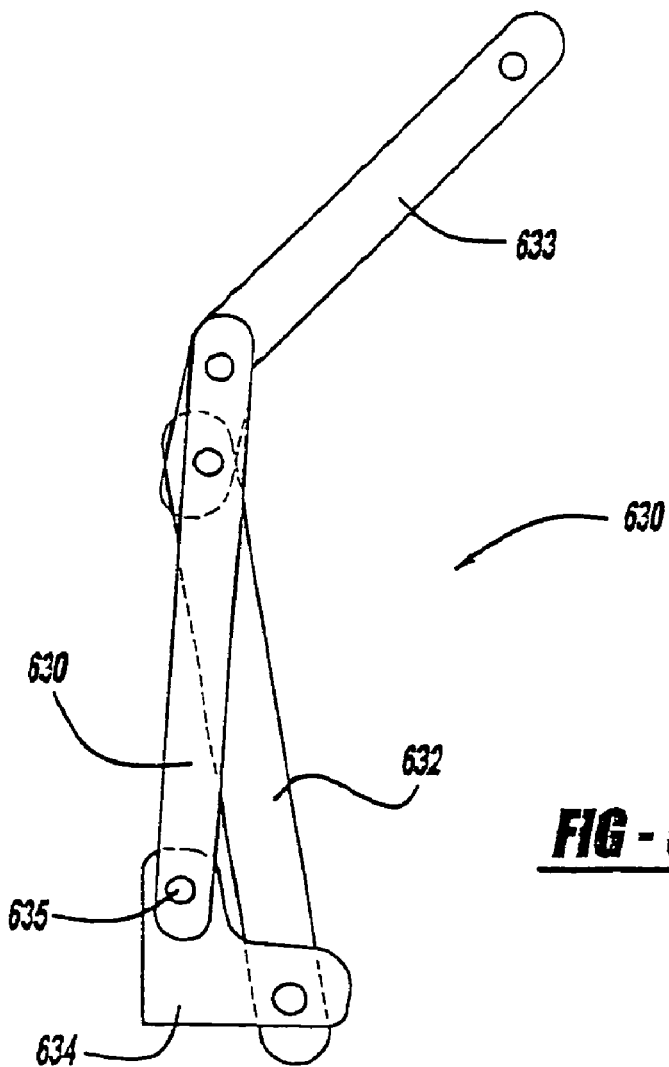
FIG. 53 is a side view of a third alternative wind deflector in an open position.

Referring to FIG. 27, an optional wind deflector is shown which may be included in area 442. Such wind deflector system 479 includes a blade 480 and arm 481, a guide 482, and a bracket 483. Wind deflector system 479 has a bias to hold blade 480 up and in the path of the wind created by vehicle. When roof is open, bias holds blade 480 and as roof closes, roof exerts pressure on arm 481 which is greater than bias, thus pushing blade 480 down to a stored position as roof closes. In an alternative embodiment, wind deflector 600 may be stored in area 442. Wind deflector includes three pieced hinge member that is attached to slide track at 603. When roof is open, wind deflector 600 is shown up and in the path of the wind as illustrated in 601. As roof closes, it makes contact to arm 602, pushing wind deflector 600 forward as shown in 601A and then into a storage position with the roof closed as shown in 601B. Wind deflector 600 has two such members, one on each track and in such embodiments, a fabric type cover may be put across each hinged member for the deflection of wind. Alternatively, wind deflector 600 may have hinged member 601 that includes parts that are continuous across the vehicle and attached at the other track in a mirrored image of wind deflector 600. In such embodiments, the middle may be solid across the vehicle or it may include perforations or castles, depending on result from wind tunnel studies. Wind deflector 600 may be stored in area 442. Wind deflector may be moved to various heights by sliding the mechanism forward to increase the angle and height of the wind deflector and backwards or to the back of the vehicle to decrease the angle of attack and shorten the wind deflector. The wind deflector may be stowed in area 442 by moving the slide all the way toward the rear and the wind deflector folds down and into the area 442. As shown in FIG. 29, a second alternative embodiment of a wind deflector 620 is shown. In this embodiment, wind deflector 620 comprises a member 623 that is attached to vehicle as well as attached to a moving member 621 which has a bias 625 at their connection. Such bias 625 allows wind deflector to be open and when roof closes, it exerts pressure on member 621 that is greater than bias 625, thus closing wind deflector. Wind deflector 620 also includes cross car component 622 which mates with mirrored images 623, 621 and 625 on the opposite side of the vehicle. The components of wind deflector 620 make a frame that is wrapped with a fabric 624. Fabric 624 is foldable such that it does not impede the closing of member 621 moves as roof closes. Referring to FIGS. 52 and 53, a third alternate embodiment of the wind deflector is shown. In such embodiments, wind deflector 630 includes drive link 631, rotor link 632, slave link 633 and driving rotor mount 634. Driving rotor mount 634 is connected to vehicle as well as connected to drive link 631 and rotor link 632. In the connection between drive link and driving rotor mount, a bias 625 holds wind deflector 630 in an open position as shown in FIG. 53. As the roof closes, it engages drive link 631 moving with a force greater than bias 625, thus moving wind deflector 630 forward and into a closed position as shown in FIG. 52. Wind deflector 630 includes a mirrored image on the other side of the vehicle. Wind deflector 630 may include a solid member between slave links 633 and in such embodiments, a solid member may be made of a light metal such as aluminum or an alloy, or may be made of a plastic or carbon fiber. The solid member may be perforated, castled or the like as set forth from wind tunnel studies. Alternatively, wind deflector 630 is a mirrored image cross car and has a cross car component similar to 622 in FIG. 29 and has a fabric similar to 624 that runs along slave drive 633 and drive link 631.

Figure 30:
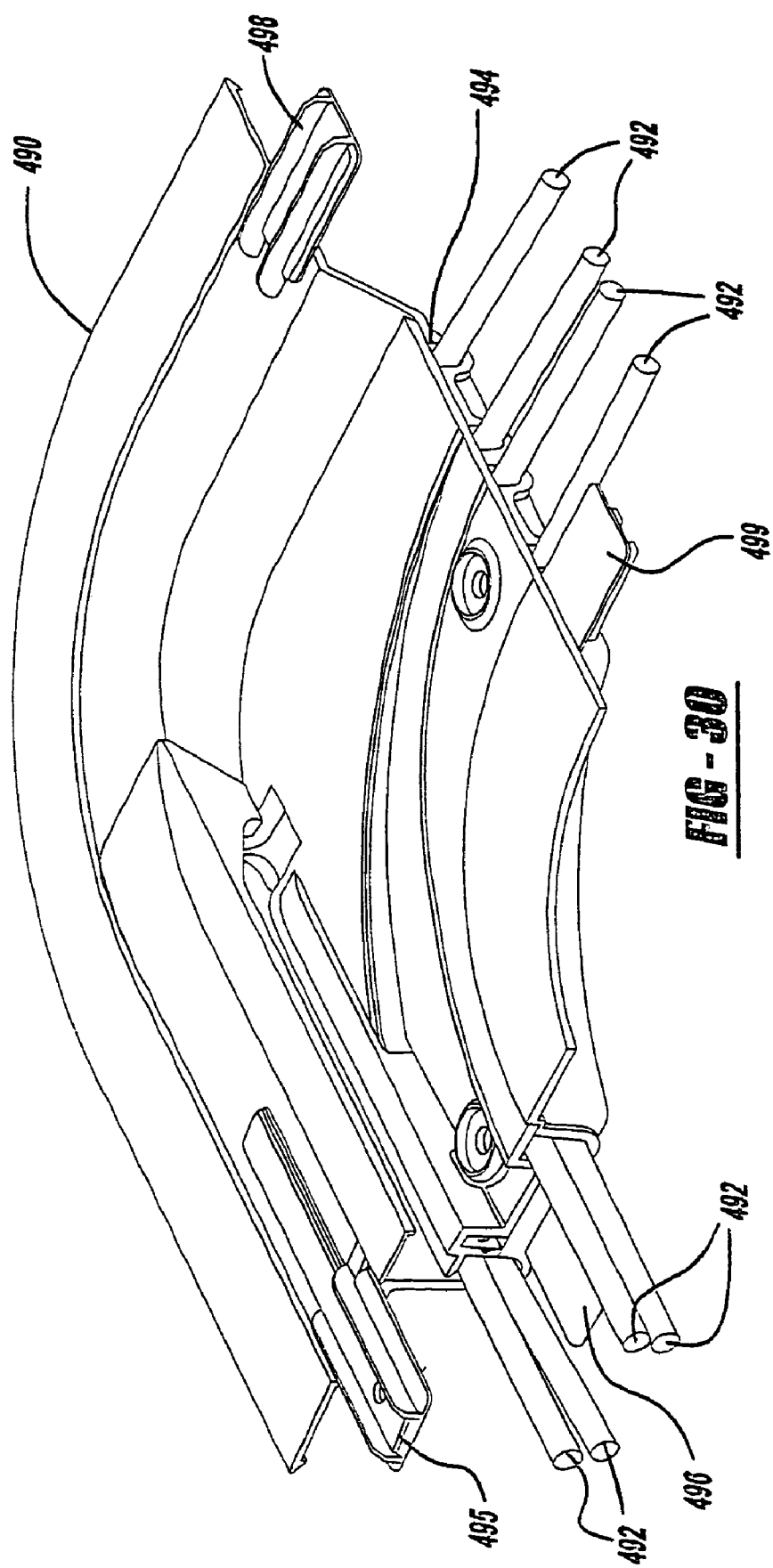
FIG. 30 is a perspective view of a preferred embodiment of corner piece.
Figure 31:
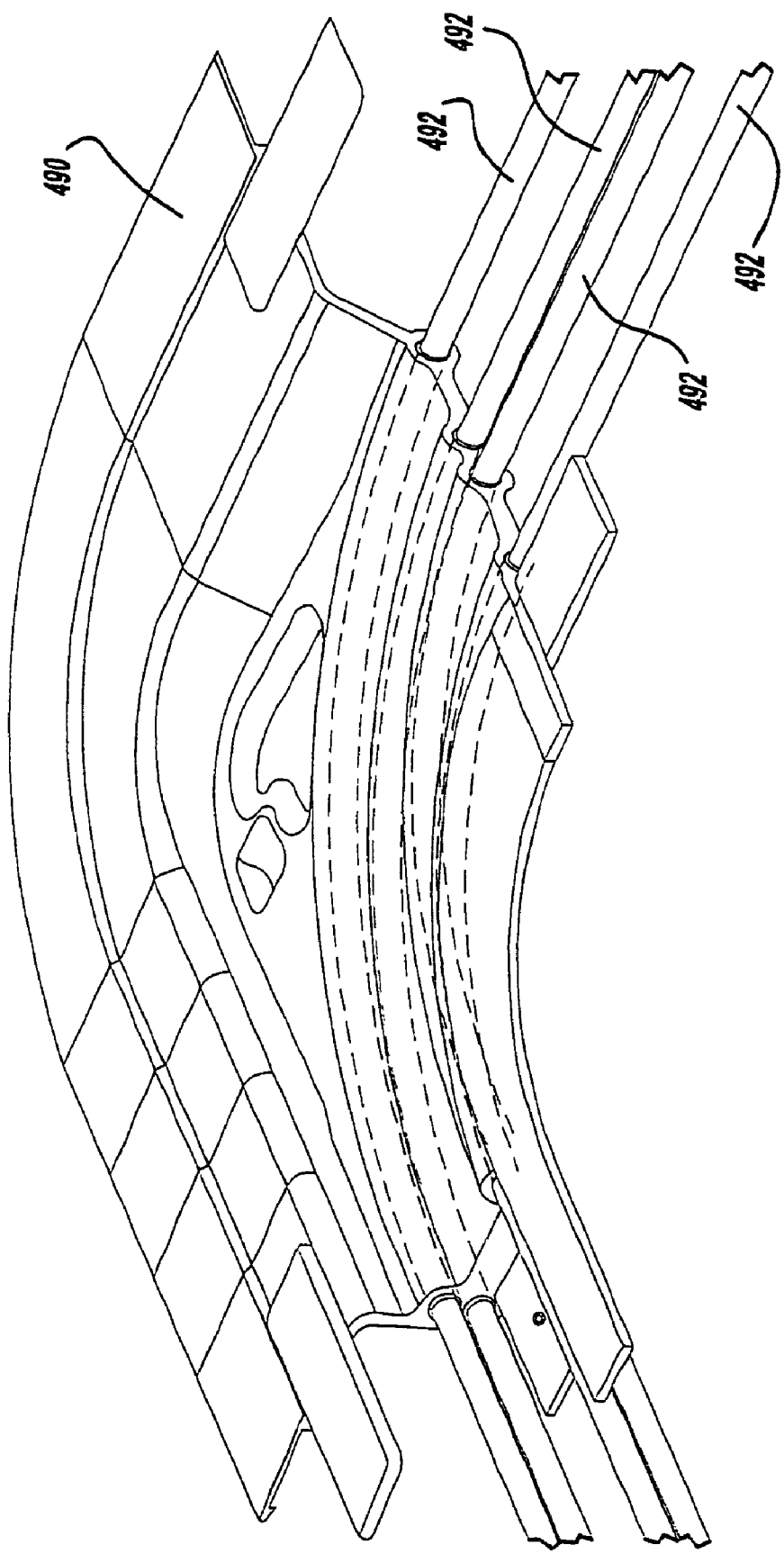
FIG. 31 is a perspective view of preferred embodiment of a corner piece illustrating drive cables inside the corner piece.
Figure 32:
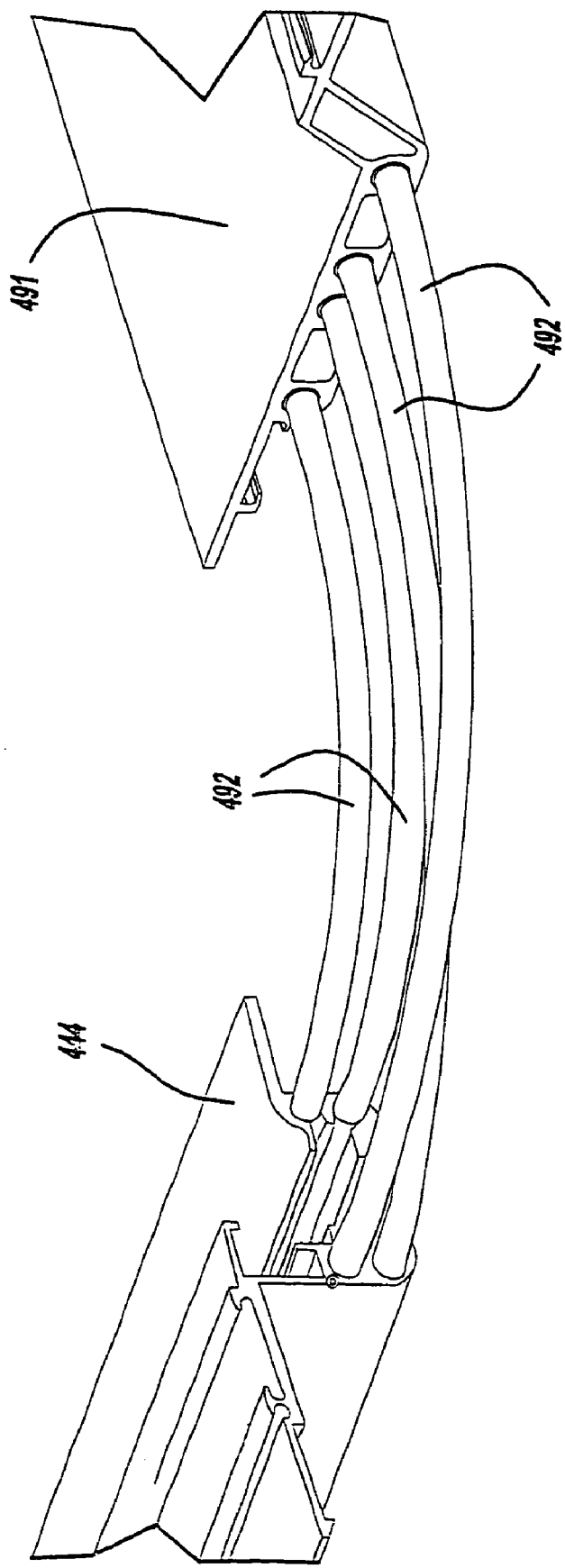
FIG. 32 is a perspective view of the drive cables and tracks.

With reference to FIGS. 30-32, a preferred embodiment of a corner piece for guide track or rail system is illustrated. Corner piece 490 interfaces with track 444 and is attached using with lateral apertures 495 and 496. Alternatively, more lateral apertures may be used or less lateral apertures may be used. Corner piece 490 is attached to header component 491 by lateral apertures 498, 499. Alternatively, corner piece 490 may be attached to header component 491 with more lateral apertures or corner piece 490 may be attached to header component 491. Corner piece 490 includes four cable guides 494 and the cable guides have drive cables 492 running through them. Drive cables 492 control opening and closing of the roof, as explained above, and the use of corner piece 490 allows drive cables 492 to come from header component 491 in one plane and enters track 444 in a stacked parallel configuration.

Figure 50:
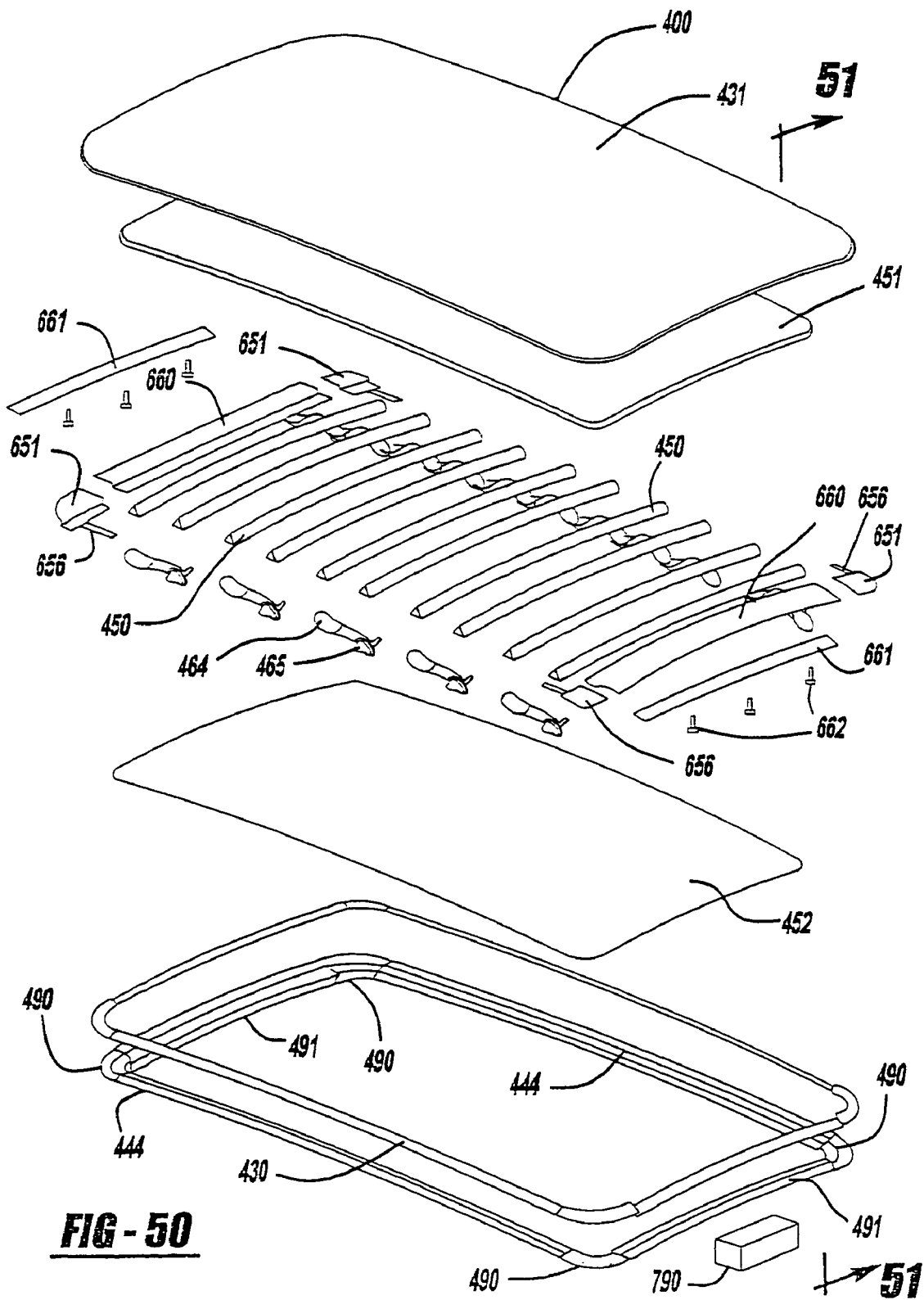
FIG. 50 is an enlarged and exploded perspective view from the rear showing the complete subassembly of a second preferred embodiment of open air system of the present invention.

FIG. 50 shows an exploded rear perspective view of a subassembly of a second preferred embodiment of open air system 400. Subassembly includes outer fabric surface 430, padding 451, cross bows 450, and header 452. Connected to cross bows 450 are lift mechanisms comprising slider 454 and arm 465. The slider 454 is operably connected to guide track 444 which includes corner pieces 490 and arm 464 is operably connected to cross bow 450. Lift mechanism 650 includes a bow end cap assembly 650, which is connected to an upper cross vehicle member 660 and a lower cross vehicle member 661 with fasteners 662. Two end cap assemblies 650, along with upper member 660 and lower member 661 comprise end cross bow. Also included in subassembly is seal 430 and drive mechanism 790 which includes two motors, four drive cables and ECU. FIG. 51 is a cross sectional view of FIG. 50 showing the assembly of the upper cross vehicle member 660 and lower cross vehicle member 661 with fastener 662. Upper roof surface 431 and, in an alternate embodiment, headliner 452 are sandwiched into a J-channel created by upper cross vehicle member 660 and lower cross vehicle member 661 and held by tightening fastener 662.

Figure 35:
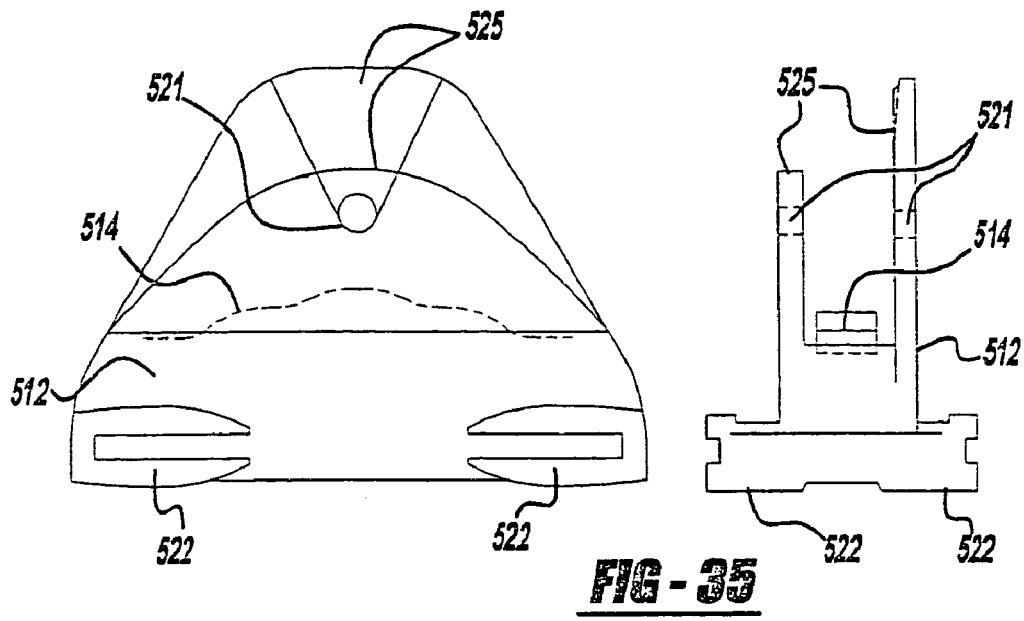
FIG. 35 is a side view and forward view of an alternative embodiment of slide piece.
Figure 36:
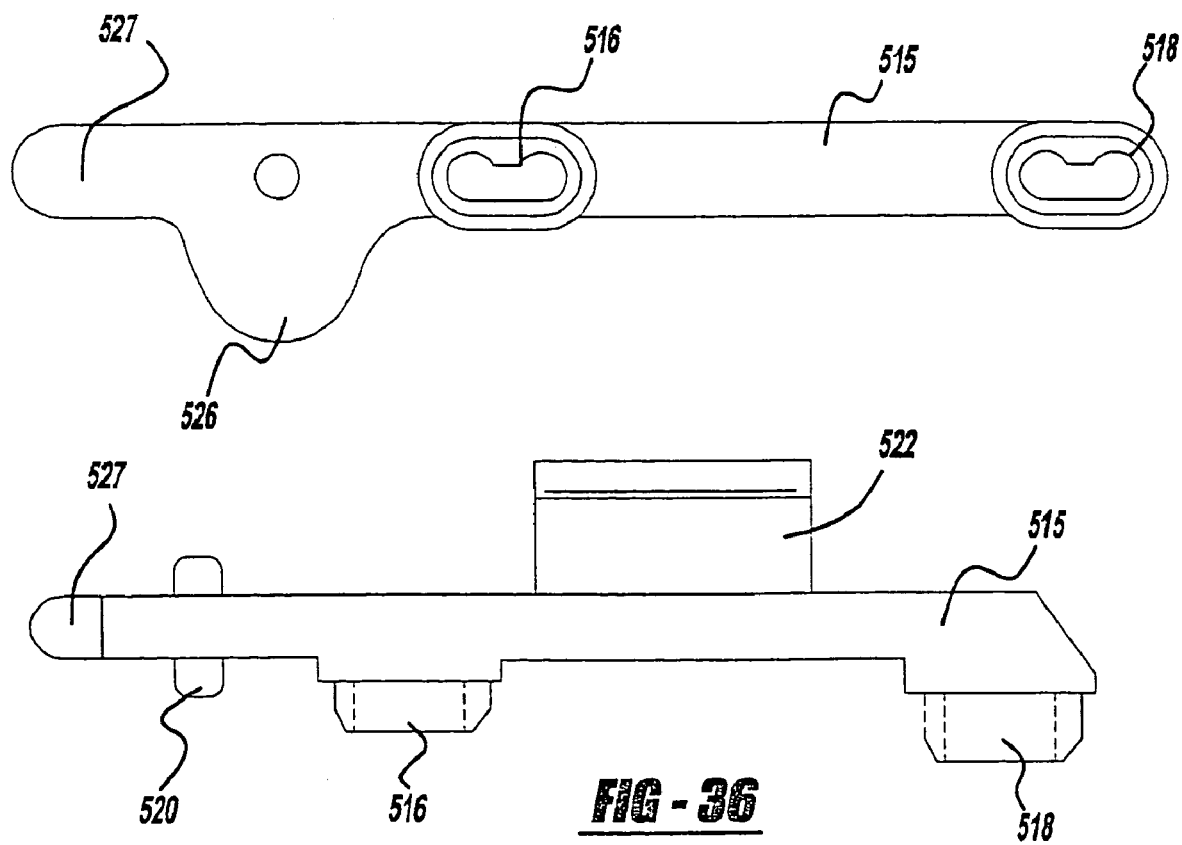
FIG. 36 is a side view and top view of an alternative embodiment of lift arm.
Figure 37:
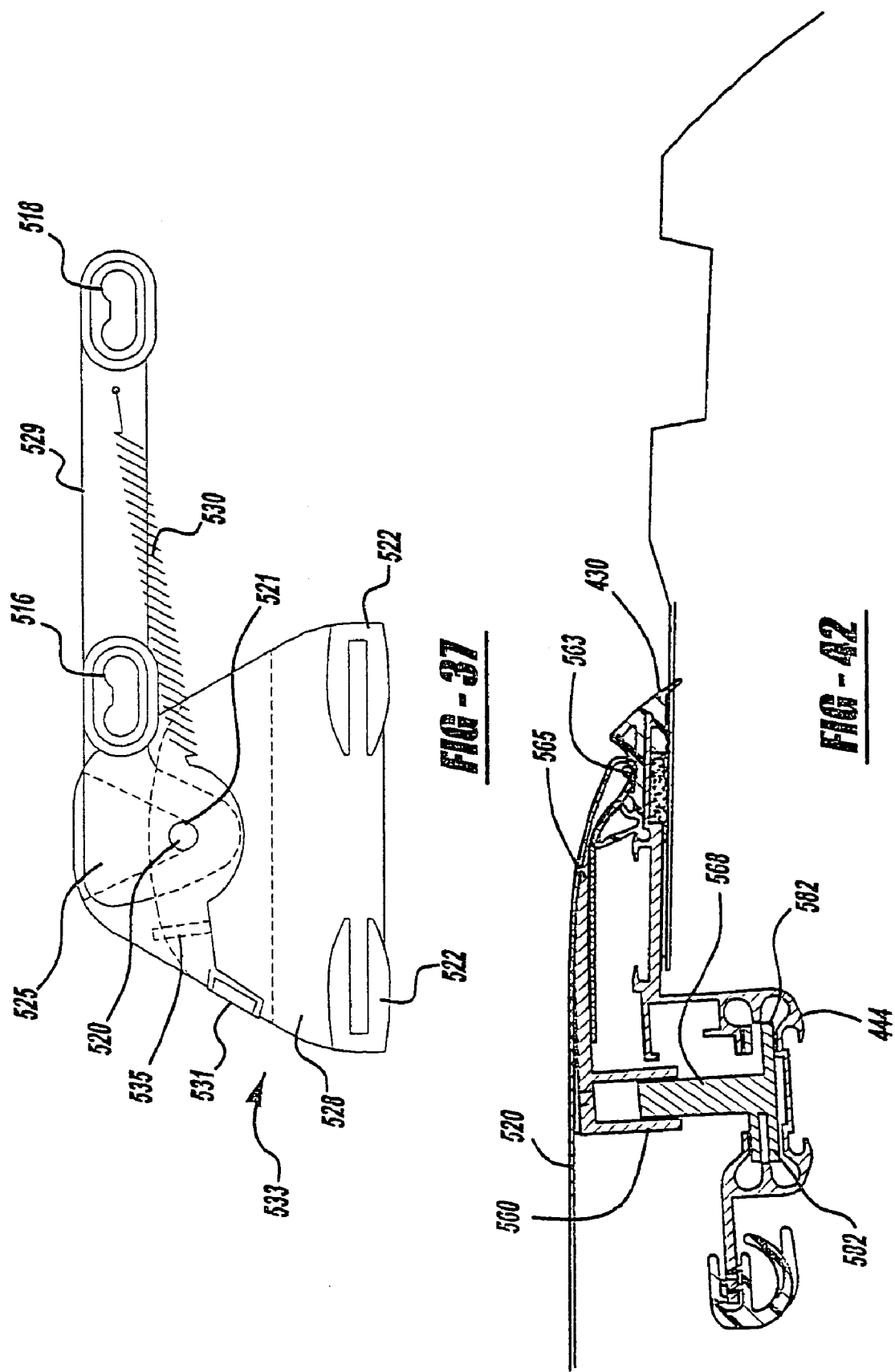
FIG. 37 is a side view of a second preferred embodiment of lift mechanism.
Figure 38:
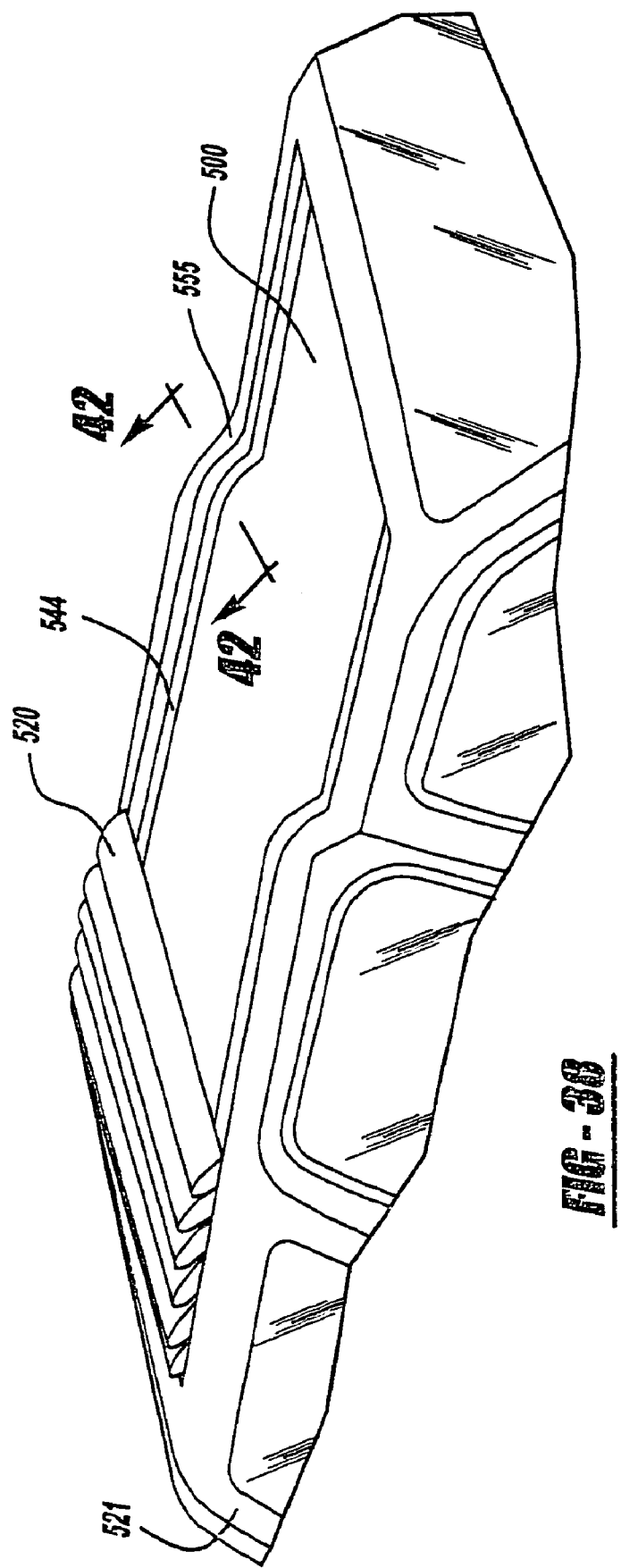
FIG. 38 is a front perspective view of a third preferred embodiment of the present invention with the roof open from the front.

FIGS. 33-37 illustrate various embodiments of lift mechanisms that may be used with the present teachings to assist in the opening and closing of the open air roof. Lift assemblies shown in FIGS. 33-37 are advantageous to allow better lift in opening and an improved neutral position when the roof is closed. An improved neutral position seals the roof better to outside elements and air gusts and helps prevent buffeting and/or chatter in the roof when a vehicle is driven at higher speeds. Other improvements include the lift assembly produced using three parts including a spring, which is fewer parts than the prior art. In addition, lift assemblies are advantageous by raising the roof above tracks and seal in the lift position which substantially decreases wear on roof and seals and improves long term sealing of roof. Another improvement includes the placement of the connectors to the bows so that the roof has improved opening capability and less wear on interior headliner parts and seals. In preferred embodiments, as shown in FIGS. 33-37, referring to lift assembly 510, sliding piece 512 is designed so that feet 522 ride in a track and may be connected to a drive cable. Slide piece 512 is designed so that it is operably slidable in track, for example, such as 444 in FIG. 32 with minimal wobble or bending within track. Slide piece 512 comprises a spring 514 and such a spring may be a leaf spring. Slide piece 512 may have sides that have equivalent heights as shown in FIG. 34 or may have sides that are at different heights, as shown in FIG. 35. Slide piece 512 has a hole 521 that goes through each side and holes are set in a line that is perpendicular to the sides. In addition, slide piece 512 may have recessed areas 525 making assembly easier. Lift arm 515 includes bow attachment apertures 518 and 516. The lift arm also includes pin 520 which fits into hole 521 during assembly and for operation of open air roof. Lift arm is designed so that surface 526 is operable with spring 514 and may include shaping or a cam to have the best and angles of opening and neutral positions and such can be controlled by shaping area 526 to work best with spring 514. Lift arm 515 includes a flag 522 and flag 522 assists in keeping roof operably taut in a closed position. In an alternative embodiment, lift arm uses a coil spring 530 which is attached to lift arm 529 at point 532 and to slide piece 528 at point 531, as shown in FIG. 37. All other aspects of lift assembly 533 is similar to lift assembly 510. Lift mechanism 533, a flag such as shown as piece 522 may be included on lift arm 531. In a second alternative embodiment of lift assembly 510 or 533 may be employed without a spring or other bias types. In a third alternative embodiment, lift assembly 510 or 533 includes a stop for a fully closed or a fully closed position. Examples of a stop for a fully opened position is shown in FIG. 36. Stop 527 is illustrating such a design on arm 515 may be used in any embodiment. Another example of a stop for a fully opened position is illustrated in FIG. 37 where stop 535 is part of slider unit 528. Various embodiments of a lift mechanism further comprises a clip 517 as illustrated in FIG. 34. Such clip 517 may be utilized to hold interior roof headliner.

In a third preferred embodiment, open air roof system 500 is shown in FIG. 37. In this embodiment, open air system 500 includes an angled portion or step 555 in track 544. Such angled portion is due to a change in elevations of the roof line of vehicle 521. Roof 520 is opened and closed using similar operation to move open air system 400, as shown in FIGS. 16-19 and discussed above. In this embodiment, a specially designed lift assembly is needed to seal roof 520 in the closed position. Such a lift assembly 560 is shown in FIGS. 39-42 and 49. Lift assembly 560 is designed to seal at angled position step 555 in the closed position. The shape curvature and size of 560 depends on angled portion or step 555 and will vary from vehicle 521 to other vehicles with similar roof lines comprising different elevations. Roof mechanism 560 includes a slider piece 568 and a lift arm piece 570. Lift arm piece 570 is fitted into a hole 573 and slider piece 568 and secured with a pin 572. In a preferred embodiment, as shown above, this pin 572 is fabricated as part of lift arm 570. In an alternative embodiment, a metal pin may be used to fasten slider mechanism and lift arm at the pivot point. In a preferred embodiment, lift arm 570 comprises curved flags 564, 565 to operably seal roof 520 when it is closed to roof line at step 555. Lift arm 570 includes at least two cross bow connections with one cross bow connector 576 being fixed in the front on the slider 568 and at least one cross bow connector 574, 572 on arms 570, as illustrated in FIGS. 39, 40, 41 and 49. As shown in FIGS. 39, 40 and 41, lift assembly 560 includes a fixed bow connector 576 and two floating bows 574, 572. Tension cable 563 is connected to flags 565, 564 to assist in sealing roof 520 to seals 463 when roof is in closed position. A spring may be included in cable 563 on each side of the lift assembly 560 to help lift assembly slides in track 444 using sliders 582. Lift assembly 560 may or may not include a spring. For example, a leaf spring or a coil spring may be employed with lift assembly 560 similarly to embodiments discussed in detail above. In a second preferred embodiment referring to FIG. 49, lift mechanism described in FIGS. 38, 39, 40 and 41 is similar to lift mechanism 590 but has a continuous flag 591 and tension cable 563 is attached to either side of flag 591. In such embodiments, a single flag may be necessary due to the stress and/or tension created on lift arm assembly 570 when in a closed position on step 555.

In some embodiments, a vehicle has such an open roof system as described herein that may need to be reinforced to meet U.S. government side impact crash requirements. In some embodiments, reinforcement may include a cross beam as shown in FIGS. 16-19 and described by the present teachings. In other embodiments, reinforcement may include tying together an A-pillar to a B-pillar or a B-pillar to a C-pillar etc., for example, as shown in U.S. Pat. No. 6,817,654. In some embodiments, open air roof system may include a moveable screen or roof such that the screen may be employed to keep an open air feeling but yet protect from flying insects. Such an embodiment employing a screen may be useful for when the roof is open for camping and/or tent configurations on an SUV. In such an embodiment, employing a screen would be useful for such activities as camping out or sleeping outdoors while in the comfort and security of a vehicle. The screen also may be useful for driving in off road activities to prevent debris from flying in and injuring the driver and/or passengers. In some embodiments, a screen may be useful for diffusing air when the roof is open so that when the vehicle is driven at higher speeds, driver and passengers can remain comfortable from high wind forces due to the diffusion through the screen.

While various embodiments of an automotive vehicle open air system has been disclosed herein, it should be appreciated that other variations will still fall within the scope of the present invention. For example, generally rigid rods or pulley-type cables can be employed in place of Bowden cables. Gears of the motor may directly contact a rack-like track, or a jack screw, tape drive or hydraulic mechanism can also be provided for any of the moving components. Additionally, the number and arrangement of linkages, cams, brackets, switches and electric motors can be varied as long as the functions of the present invention are achieved.

Figure 47:
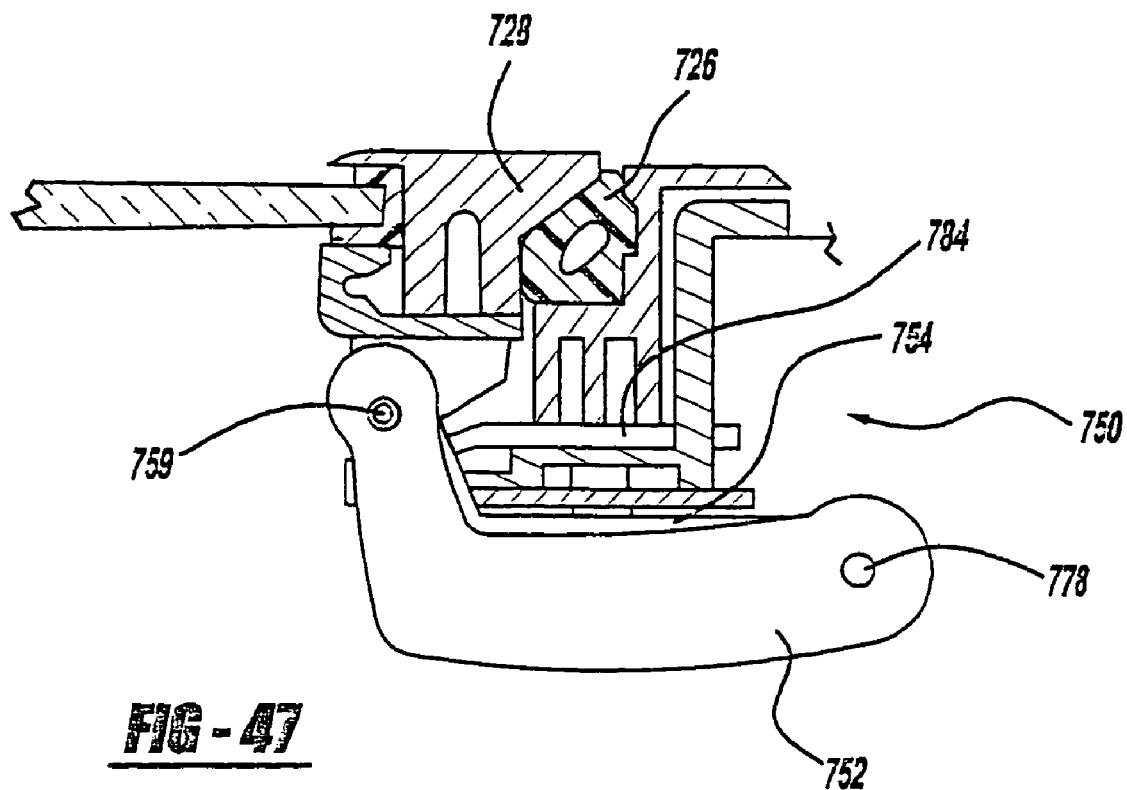
FIG. 47 is a side view of a preferred embodiment of fastening system of removable window in a closed position.
Figure 44:
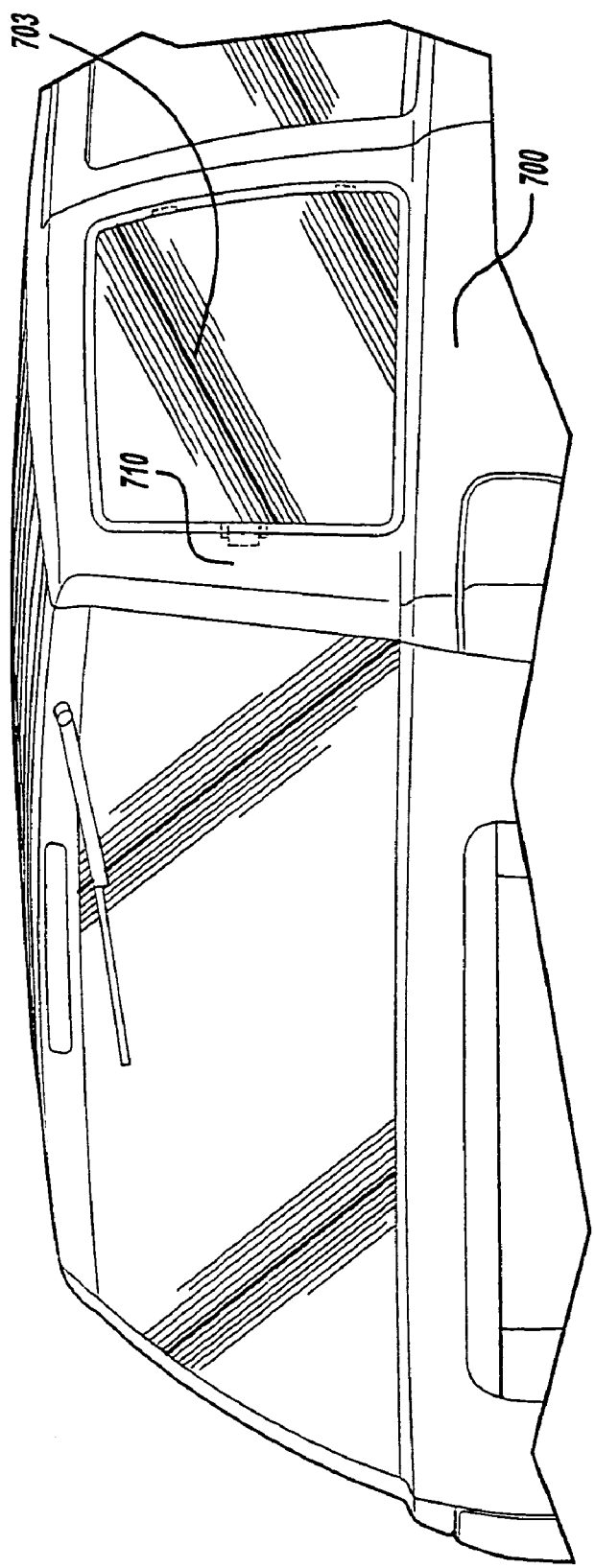
FIG. 44 is a fragmentary rear perspective view of preferred embodiment of removable window.
Figure 45:
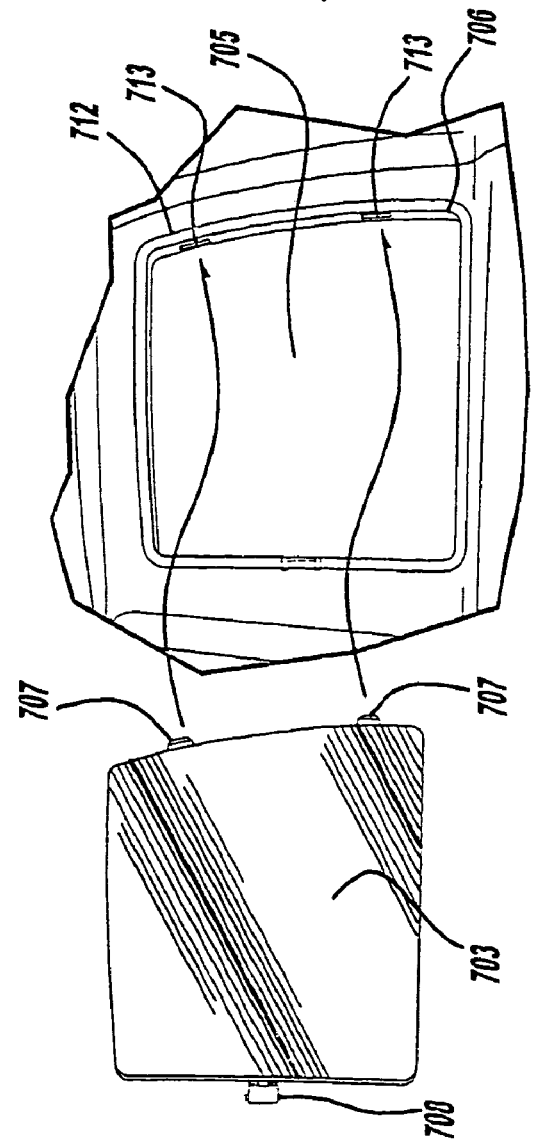
FIG. 45 is a fragmentary rear view showing removal of preferred embodiment of removable window.
Figure 48:
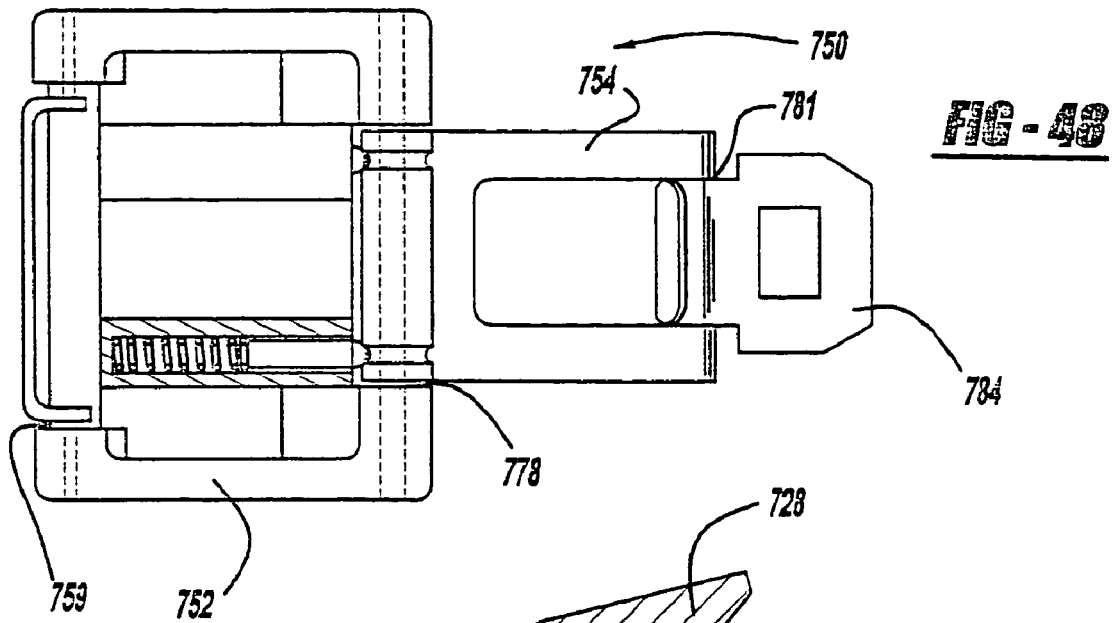
FIG. 48 is a top view of preferred embodiment of fastener system of removable window.
Figure 46:
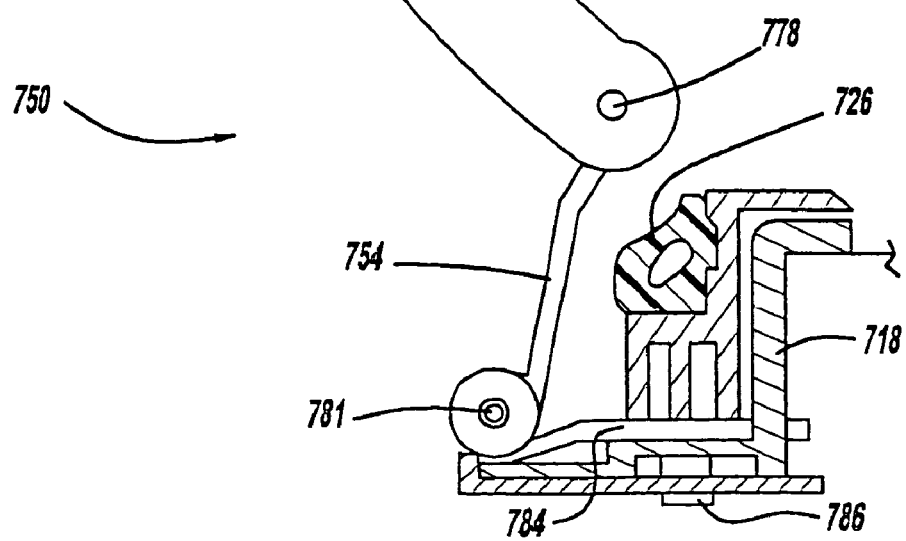
FIG. 46 is a side view of a preferred embodiment of fastening system of removable window shown in an open position.

FIGS. 44 and 45 show a rear window 703 that is part of automotive vehicle 700. The window 703 is removable from the vehicle 700 and is located between a C-pillar 702 and a D-pillar 701. The opening 705 of the window 703 on vehicle 700 is shown and has a seal 706 to seal the window from the outside elements. The window 703 has hinges 707 and a fastener 708. The window may be removed or may be vented. The window assembly 703 is pivotally mounted within a frame 712 which includes a seal 706. The frame 712 has apertures 713 in which a hinged feature 707 is installed. FIGS. 46, 47 and 48 show the latch mechanism which is in the form of a two piece toggle linkage comprising a first and second link. The first ink 752 may be grasped and pivoted in an upward direction to raise the rear edge of the window assembly 703 upward from the vehicle body structure 710 of the vehicle to the position shown in FIG. 46. The latch mechanism 750 is constructed with two stable states of an over-center condition. The first stable state occurs when the pivot pin 778 connecting one end of the first and second links 752, 754 together has been pivoted rearward of the aligned hinged pins 759, 781 at the other ends of the first and second links 752, 754, respectively, as illustrated in FIG. 46. In this position, the latch mechanism 750 is maintained in a stable position which supports the window in a partially opened venting position.

When it is desired to move the window to the completely closed position, illustrated in FIG. 47, the first link 752 is grasped and pulled forward until the hinge pin 778 passes through the aligned hinge pins 759, 781, thereby collapsing the latch mechanism 750 and lowering the window to the closed position. Upon reaching the fully closed position, the latch mechanism 750 reaches its second stable state in which the hinge pin 778 connecting the first and second links 752, 754 passes through the aligned hinge pins 759, 781 to firmly hold the latch mechanism 750 in position and engage the window assembly 728 with the seal strip 726 supported on the top of the outer frame member 722 of the frame assembly 718. Latch mechanism 750 may be removed from frame assembly 718 by having latch mechanism 750 in an open position as illustrated in FIG. 46 then depressing button 786 and removing tongue 784 from frame assembly 718. Once latch mechanism 750 has been removed, window 703 may be removed from vehicle 700.

The examples and other embodiments described herein are exemplary and are not intended to be limiting in describing the full scope of apparatus, systems, compositions, materials, and methods of this invention. Equivalent changes, modifications, variations in specific embodiments, apparatus, systems, compositions, materials and methods may be made within the scope of the present invention with substantially similar results. Such changes, modifications or variations are not to be regarded as a departure from the spirit and scope of the invention. All patents cited herein, as well as all publications discussed herein, are incorporated in their entirety herein by reference.

What is claimed is:

1. A soft top roof of an automotive vehicle roof system comprising:
   a guide track;
   a slider moveable along the guide track;
   an arm connected to the slider at a pivot and moveable from a neutral position to a lift position;
   a biasing member operably holding the arm in the neutral position; and
   at least two cross bow connections located on the arm above the pivot point.

2. The roof system according to claim 1 further comprising at least two cross bows.

3. The roof system according to claim 2 further comprising a fabric operably connected to the at least two cross bows.

4. The roof system according to claim 1 further comprising means for moving the slider along the guide track.

5. The roof system according to claim 1 further comprising a stop operably holding the arm in the lift position.

6. The roof system according to claim 1, wherein the biasing member comprises a spring.

7. The roof system according to claim 1 further comprising at least two motors operably driving four drive cables, the slider being coupled to at least one of the cables.

8. The roof system according to claim 1 further comprising a plurality of lift mechanisms operably moveable in the guide track, at least one of the lift mechanisms including the slider.

9. The roof system according to claim 1 further comprising a flexible roof that is coupled to the guide track.

10. An automotive vehicle roof system comprising:
    at least two spaced apart tracks;
    at least one member movable in a substantially fore-and-aft direction along each of the tracks;
    at least one arm movable substantially fore-and-aft with each of the members and being movable relative to each of the members, the at least one arm operably pivots in an upward direction relative to an associated one of the members;
    a structure extending from the at least one arm assisting in sealing of the roof;
    at least one cross bow connected to the at least one arm and spanning between the tracks entirely within an outboard side of the at least one arm; and
    a flexible roof coupled to the cross bow and movable in a substantially fore-and-aft directions,
    wherein the structure is integral to the at least one arm and the at least one cross bow is separate and distinct from the structure.

11. The roof system according to claim 10 further comprising a second cross bow connected to the at least one arm.

12. The roof system according to claim 10 further comprising a cable operably moving the member, at least part of the cable being hidden inside at least one of the tracks.

13. The roof system according to claim 10 wherein said structure outwardly projects from the at least one arm away from the at least one cross bow.

14. The roof system according to claim 10 wherein a majority of the tracks is elongated in a substantially fore-and-aft direction along at least one substantially horizontal plane.

15. The roof system according to claim 10 further comprising a spring coupled to the at least one arm.

16. An automotive vehicle roof system comprising:
    a fabric sunroof having a front edge rearwardly movable and a rear edge forwardly movable;
    a slider movable in a substantially fore-and-aft direction;
    an arm coupled to and pivotable relative to the slider;
    a cross bow coupled to the arm and supporting the fabric sunroof;
    a structure outwardly projecting from the arm away from the cross bowl;
    an elongated member coupled to the slider;
    an electromagnetic actuator operably driving the elongated member; and
    a second cross bow connected to the arm.

17. The roof system according to claim 16 further comprising a structure extending from the arm directly contacting a seal of the fabric sunroof in at least one operating condition.

18. The roof system according to claim 16 further comprising a spring coupled to the arm.

19. The roof system according to claim 16 wherein the arm extends a greater fore-and-aft dimension than does the associated slider, and the arm operably pivots in an upward direction relative to the associated slider.

20. An automotive vehicle roof system comprising:
    at least two spaced apart tracks;
    at least one member movable in a substantially fore-and-aft direction along each of the tracks;
    at least one arm movable substantially fore-and-aft with each of the members and being movable relative to each of the members, the at least one arm operably pivots in an upward direction relative to an associated one of the members;
    a structure extending from the at least one arm assisting in sealing of the roof;
    at least one cross bow connected to the at least one arm and spanning between the tracks entirely within an outboard side of the at least one arm; and
    a flexible roof coupled to the cross bow and movable in a substantially fore-and-aft direction,
    wherein the entire structure is offset from the at least one cross bow in a fore-and-aft direction.

21. The roof system according to claim 20 further comprising a second cross bow connected to the at least one arm.

22. The roof system according to claim 20 further comprising a cable operably moving the member, at least part of the cable being hidden inside at least one of the tracks.

23. The roof system according to claim 20 wherein said structure outwardly projects from the at least one arm away from the at least one cross bow.

24. The roof system according to claim 20 wherein a majority of the tracks is elongated in a substantially fore-and-aft direction along at least one substantially horizontal plane.

25. The roof system according to claim 20 further comprising a spring coupled to the at least one arm.

* * * * *

UNITED STATES PATENT AND TRADEMARK OFFICE
CERTIFICATE OF CORRECTION

PATENT NO. : 7,399,030 B2
APPLICATION NO. : 11/637578
DATED : July 15, 2008
INVENTOR(S) : Cliff R. Reitzloff and Michael J. Urban It is certified that error appears in the above-identified patent and that said Letters Patent is hereby corrected as shown below:

Column 2, line 27, "advantageous" should be --advantages--.

Column 4, line 16, after "FIG. 37", insert --taken--.

Column 4, line 37, after "FIG. 50", insert --taken--.

Column 10, line 46, "connecting pieces 651" should be --connecting pieces 652--.

Column 13, line 2, after "embodiment", delete "of".

Column 13, line 5, first occurrence of "fully closed" should be --fully open--.

Column 14, line 35, "ink" should be --link--.

Column 15, line 55, Claim 10, "directions" should be --direction--.

Column 16, line 17, Claim 16, "bowl" should be --bow--.

Signed and Sealed this

Seventeenth Day of February, 2009

JOHN DOLL
*Acting Director of the United States Patent and Trademark Office*